(12) United States Patent
Lin et al.

(10) Patent No.: US 9,449,583 B2
(45) Date of Patent: Sep. 20, 2016

(54) CONTROL METHOD AND ELECTRONIC APPARATUS

(71) Applicant: Lenovo (Beijing) Co., Ltd., Haidian District, Beijing (CN)

(72) Inventors: Weizhi Lin, Beijing (CN); Yu Chen, Beijing (CN); Lei Zhao, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 486 days.

(21) Appl. No.: 13/710,964

(22) Filed: Dec. 11, 2012

(65) Prior Publication Data
US 2013/0155114 A1   Jun. 20, 2013

(30) Foreign Application Priority Data

Dec. 15, 2011   (CN) .......................... 2011 1 0421673
Dec. 15, 2011   (CN) .......................... 2011 1 0421869
Dec. 15, 2011   (CN) .......................... 2011 1 0421886

(51) Int. Cl.
*G09G 5/34* (2006.01)
*H04N 7/14* (2006.01)

(52) U.S. Cl.
CPC ................ *G09G 5/34* (2013.01); *H04N 7/142* (2013.01); *H04N 7/147* (2013.01)

(58) Field of Classification Search
CPC .......... G06K 9/3208; G06K 9/00201; G06K 9/00228; G06K 9/00248; G06K 9/00362; G06K 9/00624; G09G 2320/026; G09G 2360/142; G09G 3/3648; H04N 5/23219; H04N 5/23293; H04N 5/335; H04N 7/15; H04N 7/181; G06F 3/0412; G06F 3/042; G06F 9/4443; H01L 27/14609; H01L 27/14641

See application file for complete search history.

(56) References Cited

U.S. PATENT DOCUMENTS 6,731,334 B1 *   5/2004   Maeng et al. ........... 348/211.12
2005/0005236 A1 *   1/2005   Brown et al. ................. 715/520

(Continued)

FOREIGN PATENT DOCUMENTS

CN   101018299 A   8/2007
CN   101667143   3/2010

(Continued)

OTHER PUBLICATIONS

Chinese First Office Action with English Translation for related Application No. 201110421869.X dated Apr. 28, 2015, 29 pages.

(Continued)

*Primary Examiner* — Sultana M Zalalee
(74) *Attorney, Agent, or Firm* — Brinks Gilson & Lione; G. Peter Nichols

(57) ABSTRACT

Embodiments of the present invention provide a control method and an electronic apparatus. The control method is applied to an electronic apparatus that includes an array of image display components and an array of image collecting components. The method includes displaying a first window by the array of image display components; obtaining the position of a first region in the first window; turning on the image collecting components corresponding to the first region in the first window in the array of image collecting components according to the position of the first region, wherein the number of the image collecting components corresponding to the first region is less than or equal to the number of the image collecting components in the array of image collecting components; and obtaining a first image by the image collecting components corresponding to the first region.

26 Claims, 15 Drawing Sheets

(56) References Cited

U.S. PATENT DOCUMENTS

| | | |
|---|---|---|
| 2006/0233192 A1 | 10/2006 | Mihara |
| 2007/0047943 A1* | 3/2007 | Seo et al. .................. 396/141 |
| 2007/0181687 A1* | 8/2007 | Fukushima et al. .......... 235/454 |
| 2008/0239131 A1* | 10/2008 | Thorn ...................... 348/333.01 |
| 2009/0222354 A1* | 9/2009 | Murphy et al. ................ 705/21 |
| 2010/0066667 A1* | 3/2010 | MacDougall et al. ........ 345/156 |
| 2010/0231562 A1* | 9/2010 | Brown ........................ 345/207 |
| 2010/0269072 A1* | 10/2010 | Sakata et al. ................ 715/863 |
| 2011/0193935 A1* | 8/2011 | Gorzynski .................. 348/14.08 |
| 2011/0249078 A1* | 10/2011 | Abuan et al. ............... 348/14.02 |
| 2012/0092318 A1* | 4/2012 | Mishra et al. ................ 345/211 |
| 2012/0154591 A1* | 6/2012 | Baur et al. .................. 348/148 |

FOREIGN PATENT DOCUMENTS

| | | |
|---|---|---|
| CN | 101833520 | 9/2010 |
| CN | 101853048 A | 10/2010 |
| CN | 102158680 A | 8/2011 |

OTHER PUBLICATIONS

Chinese First Office Action with English Translation for related Application No. 201110421886.3 dated May 28, 2015, 21 pages.

First Office Action dated Aug. 31, 2015 out of Chinese priority Application No. CN201110421673.0 (9 pages including English translation).

Second Office Action dated Jan. 25, 2016 out of corresponding Chinese priority Application No. 201110421886.3 (22 pages including English translation).

Office Action dated Jul. 14, 2016 out of corresponding Chinese Application No. 201110421886.3 (23 pages including English translation).

* cited by examiner

CONTROL METHOD AND ELECTRONIC APPARATUS

BACKGROUND OF THE INVENTION

This application claims priority to CN201110421869.X filed Dec. 15, 2011, CN201110421886.3 filed Dec. 15, 2011, and CN201110421673.0 filed Dec. 15, 2011, the entire contents of which is incorporated herein by reference.

Embodiments of the present invention relate to a control method and an electronic apparatus, and more particularly to a control method and a control device that are applied to an electronic apparatus, an electronic apparatus, a method of controlling image collection and a corresponding electronic apparatus, and a method of processing the collected image and an electronic apparatus.

With the development of science and technology, a variety of communication apparatus and applications have been widely used. Simple voice communication has been gradually unable to meet the increasingly diverse requirements of the user. At present, a lot of electronic apparatus can perform video communication by an image collecting unit such as a camera. However, the current display and camera are separate equipments. Although the camera tends to be integrated in the display, such as that in a currently popular notebook, the current camera always is integrated in the straight upward direction or the high side direction of the display, and the user's sight is to look within the screen, the cameras therefore cannot capture the front view image of the operator.

In view of this, in recent years, the array of image collecting components arranged inside a display is proposed to collect the image of an object, so as to capture the user's front view image while the user is viewing the contents displayed in the window.

However, in the case of a larger display screen, usually the image collected by only a small part of the image collecting components in the entire array is valid image for the user during the image collecting process. In this situation, image collection through the entire array of collecting components causes a waste of power, and because the collected image is large, large data traffic is needed to spend during transmission, and the effective image only is a small portion of the received image while the image is being viewed at the image receiving party.

Furthermore, in the prior art, although an electronic apparatus having a plurality of image collecting components, such as a smart phone having two cameras or the like, has been proposed to facilitate the user's use, if one application in the existing electronic apparatus occupies the cameras, other applications will not be able to use the same. For example, in an electronic apparatus installed with multiple instant messaging applications (such as QQ, MSN, etc.) that support video communication, after the video communication function is enabled in a first instant messaging application, it is impossible to enable the video communication function in a second instant messaging application, or it is impossible to capture image by the camera after the video communication function is enabled in the second instant messaging application.

In addition, in the prior art, the user is not always in a stationary state during the video communication and may need to move his/her own position. The direction of the camera in the existing electronic apparatus is fixed (for example, the camera integrated in a laptop or a mobile phone), or the user needs to manually adjust the collecting direction of the image collecting component. Therefore, the user often needs to adjust and maintain his/her own position during a video call so as to ensure that the image collecting device such as a camera or the like can collect a front view image of his/her face. This limits the activities of the user during a video call, and causes inconvenience to the user.

SUMMARY OF THE INVENTION

In order to solve the above problems, embodiments of the present invention aim at providing a control method and a control device that are applied to an electronic apparatus, and an electronic apparatus, a method of controlling image collection and a corresponding electronic apparatus, and a method of processing the collected image and an electronic apparatus.

One embodiment of the present invention provides a control method applied to an electronic apparatus, wherein the electronic apparatus comprises: an array of image display components and an array of image collecting components set in correspondence with each other along a direction perpendicular to the screen of the electronic apparatus. The method comprises: displaying a first window by the array of image display components; obtaining the position of a first region in the first window; turning on the image collecting components corresponding to the first region in the array of image collecting components according to the position of the first region, wherein the number of the image collecting components corresponding to the first region is less than or equal to the number of the image collecting components in the array of image collecting components; obtaining a first image by the image collecting components corresponding to the first region; and providing the first image to a first application to which the first window corresponds.

Another embodiment of the present invention provides an electronic apparatus, comprising: an array of image display components configured to display a first window; a region position obtaining unit configured to obtain the position of a first region in the first window; an array of image collecting components set in correspondence with the array of image display components along a direction perpendicular to the screen of the electronic apparatus; a collection control unit configured to turn on the image collecting components corresponding to the first region in the array of image collecting components according to the position of the first region, wherein the number of the image collecting components corresponding to the first region is less than or equal to the number of the image collecting components in the array of image collecting components; the array of image collecting components is configured to obtain a first image by the image collecting components corresponding to the first region. The electronic apparatus further comprises: a processing unit comprising an image providing module configured to provide the first image to a first application to which the first window corresponds.

Another embodiment of the present invention provides a control device applied to an electronic apparatus, wherein the electronic apparatus comprises: an array of image display components and an array of image collecting components set in correspondence with each other along a direction perpendicular to the screen of the electronic apparatus, a first window being displayed by the array of image display components. The control device comprises: a region position obtaining unit configured to obtain the position of a first region in the first window; a collection control unit configured to turn on the image collecting components corresponding to the first region in the array of image collecting components according to the position of the first region, wherein the number of the image collecting components corresponding to the first region is less than or equal to the number of the image collecting components in the array of image collecting components; and an image providing unit configured to provide the first image obtained by the image collecting components corresponding to the first region to a first application to which the first window corresponds.

Via the solutions provided by the above embodiments of the present invention, there is no need to turn on all the components in the array of image collecting components when turning on the apparatus, instead, only the corresponding image collecting components in the array of image collecting components are to be turned on according to the window being viewed by the user, thereby reducing the power consumed by the array of image collecting components and effectively decreasing the transmitted data amount while maintaining the image resolution.

In addition, one embodiment of the present invention provides a method of controlling image collection applied to an electronic apparatus. The method comprises: displaying a first window and a second window; turning on a first image collecting unit and a second image collecting unit of the electronic apparatus, wherein the first image collecting unit corresponds to a first window, and the second image collecting unit corresponds to a second window; obtaining a first image by the first image collecting unit, and obtaining a second image by the second image collecting unit; and providing the first image to a first application to which the first window corresponds and providing the second image to a second application to which the second window corresponds according to the correspondence between the image collecting units and the windows.

Another embodiment of the present invention provides an electronic apparatus, comprising: a display unit configured to display a first window and a second window; a first image collecting unit configured to obtain a first image; a second image collecting unit configured to obtain a second image; a collection control unit configured to turn on the first image collecting unit and the second image collecting unit, wherein the first image collecting unit corresponds to the first window, and the second image collecting unit corresponds to the second window; and a processing unit configured to provide the first image to a first application to which the first window corresponds and provide the second image to a second application to which the second window corresponds according to the correspondence between the image collecting units and the windows.

Via the solutions provided by the above embodiments of the present invention, images collected by a plurality of image collecting units can be provided to different applications, so that multiple users can independently and simultaneously perform an operation such as a video call or the like by one electronic apparatus, which brings convenience to use of the users.

In addition, one embodiment the present invention provides a method of processing the collected image applied to an electronic apparatus. The method comprises: displaying a first window; turning on a first image collecting unit corresponding to the first window; obtaining a first image by the first image collecting unit, wherein the first image has a first display direction; determining whether the first display direction complies with a predetermined display direction or not; generating a collection adjusting instruction when the first display direction does not comply with the predetermined display direction; and adjusting the first image collecting unit according to the collection adjusting instruction to obtain a second image, wherein the second image has a second display direction that complies with the predetermined display direction.

Another embodiment of the present invention provides an electronic apparatus, comprising: a display unit configured to display a first window; a collection control unit configured to turn on a first image collecting unit corresponding to the first window; a first image collecting unit configured to obtain a first image, wherein the first image has a first display direction; a processing unit configured to determine whether the first display direction complies with a predetermined display direction or not, and generate a collection adjusting instruction when the first display direction does not comply with the predetermined display direction; and a collection adjusting unit configured to adjust the first image collecting unit according to the collection adjusting instruction so as to obtain a second image, wherein the second image has a second display direction that complies with the predetermined display direction.

Via the solutions provided by the above embodiments of the present invention, the image collecting unit can be adjusted by determining whether the direction of the image collected by it complies with a predetermined display direction or not, so as to provide the image having a display direction that complies with the predetermined display direction to the corresponding application. Accordingly, the user does not need to adjust his/her own position to cater to the collecting direction of the image collecting unit.

BRIEF DESCRIPTION OF THE DRAWINGS

In order to more clearly illustrate the technical solutions of embodiments of the present invention, the following is a brief introduction of the drawings used for the description of the embodiments. Below-described drawings only are exemplary embodiments of the present invention.

DETAILED DESCRIPTION OF THE PREFERRED EMBODIMENTS

Figure 1:
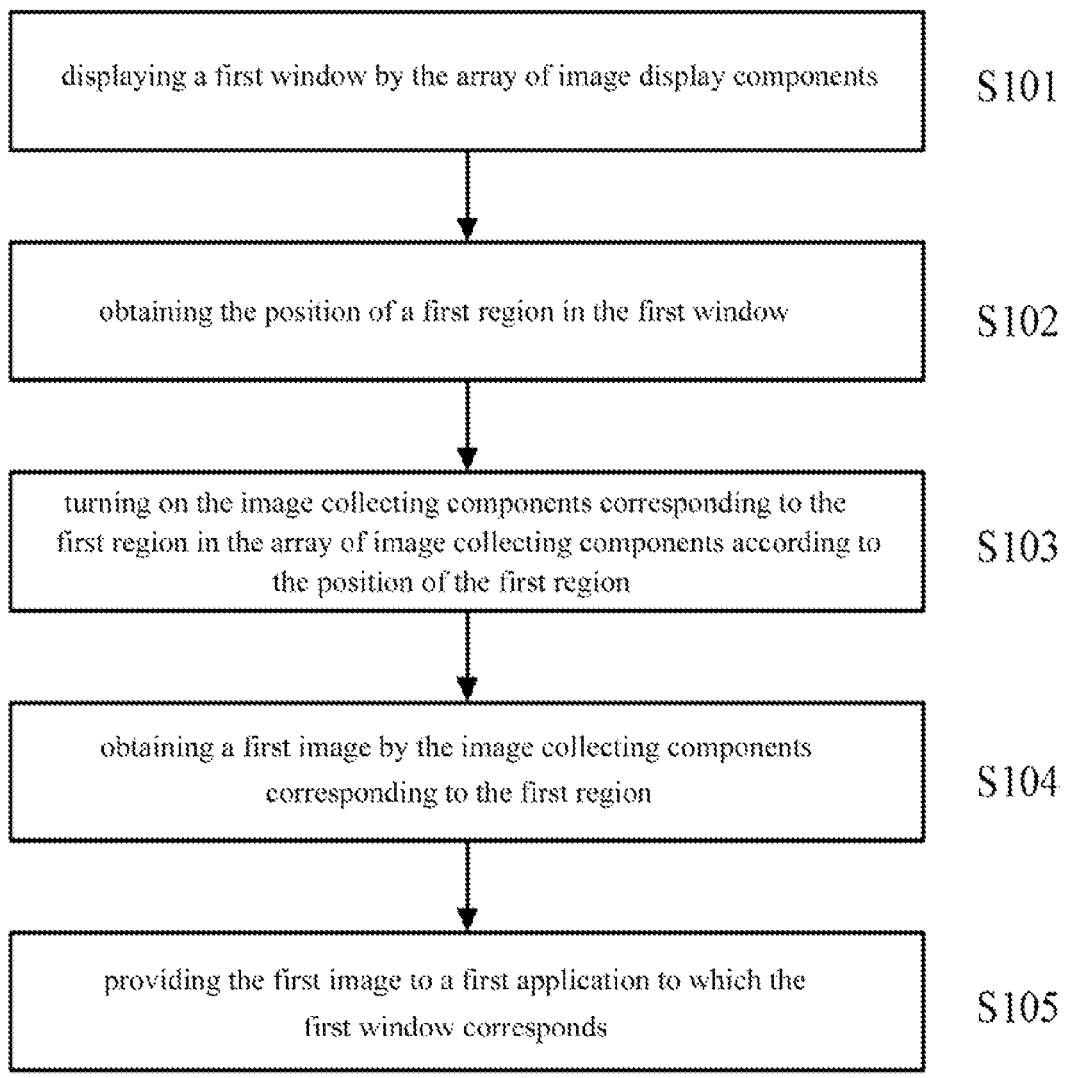
FIG. 1 is a flowchart depicting a control method according to one embodiment of the present invention.

Hereinafter, preferable embodiments of the present invention will be described in detail with reference to the accompanying drawings. Please note that in this specification and the drawings, the steps and elements that are essentially the same are denoted with the same reference numerals, and repeated explanation of these steps and elements will be omitted.

Next, a control method and a control device both applied to an electronic apparatus and the electronic apparatus according to an embodiment of the present invention are to be described in detail with reference to FIGS. 1 to 7.

FIG. 1 is a flowchart depicting a control method 100 according to one embodiment of the present invention. The control method 100 may be used for an electronic apparatus comprising an array of display components and an array of image collecting components. In particular, the electronic apparatus in this embodiment comprises an array of image display components and an array of image collecting components set in correspondence with each other along a direction perpendicular to the screen of the electronic apparatus.

According to one example of the present invention, the array of image display components and the array of image collecting components may be set in the same plane in a direction perpendicular to the screen of the electronic apparatus. For example, the image display components and the image collecting components may be set alternately every other row and/or every other column within a transparent housing of the display screen. In this way, the image collecting components can collect the image of the user who is viewing the displayed contents while the image display components are displaying images.

Alternatively, according to another example of the present invention, the array of image display components and the array of image collecting components may be set in different planes in a direction perpendicular to the screen of the electronic apparatus. For example, the array of image display components may be set near the screen housing of the electronic apparatus, and the array of image collecting components may be set behind the plane where the array of image display components is set and along a direction perpendicular to the screen of the electronic apparatus. In this situation, the image display components in the array of image display components can be switched between a turned-on state and a turned-off state with a predetermined frequency. When the image display components are turned off, the image collecting components in the array of image collecting components can be turned on so as to facilitate the image collection through the transparent housing of the screen.

Hereinafter, a control method according to an embodiment of the present invention will be described with reference to FIG. 1. As shown in FIG. 1, in step S101, a first window is displayed by the array of image display components. According to one example of the present invention, the first window may correspond to a first application installed on an electronic apparatus. In step S102, the position of a first region in the first window is obtained. The first region may be less than or equal to the display region of the first window. For example, the first window may include an image display region and a function selection region, and the first region may be the image display region in the first window.

Then, in step S103, the image collecting components corresponding to the first region in the array of image collecting components are turned on according to the position of the first region. As described above, the first region may be less than or equal to the display region of the first window. Accordingly, the number of the image collecting components corresponding to the first region is less than or equal to the number of the image collecting components in the array of image collecting components. According to one example of the present invention, when the array of image display components and the array of image collecting components are set in the same plane in a direction perpendicular to the screen of the electronic apparatus, the image collecting components corresponding to the first region may include the components located within the display range of the first window; whereas when the array of image display components and the array of image collecting components are set in different planes in a direction perpendicular to the screen of the electronic apparatus, the image collecting components corresponding to the first region may include the image collecting components within a range corresponding to the display region of the first window in the array of image collecting components.

In addition, according to another example of the present invention, an image collecting instruction may be received. And in step S103, according to the image collecting instruction and based on the position of the first region, the image collecting components corresponding to the first region in the array of image collecting components are turned on.

In step S104, a first image is obtained by the image collecting components corresponding to the first region.

Then, in step S105, the first image is provided to a first application to which the first window corresponds. According to one example of the present invention, the first application may be instant communication applications capable of performing video transmission, or other applications supporting an image collection function or capable of processing the collected image.

Via the control method provided by this embodiment, there is no need to turn on all the components in the array of image collecting components when turning on the apparatus, instead, only the corresponding image collecting components in the array of image collecting components are to be turned on according to the window being viewed by the user, thereby reducing the power consumed by the array of image collecting components and effectively decreasing the transmitted data amount while maintaining the image resolution.

According to one example of the present invention, the collected first image may be displayed in the first region. Alternatively, the contents displayed in the first region may be independent of the collected first image. For example, when the first application to which the first window corresponds is an instant communication application, it is possible to display the image of the counter party in communication with the user using the current electronic apparatus in the first region. Since the user is viewing the image of the counter party in communication in the first region during a video call, it is possible to collect the front view image of the user by the image collecting components corresponding to the first region so as to transmit the same to the counter party in communication. In addition, when the first application to which the first window corresponds is an instant communication application, in addition to the first region, the first window may further include a local image viewing region to display the first image collected by the first image collecting unit.

In addition, according to another example of the present invention, the method shown in FIG. 1 may further comprise determining a free region that displays no window in the array of image collecting components, and turning off the image collecting components corresponding to the free region in the array of image collecting components. For example, the free region that displays no window in the array of image collecting components may be determined with a predetermined time interval. Further, when the first window is closed, the image collecting components corresponding to the first region in the first window may be turned off, so that the image collecting components are able to not only be turned on according to the opening of the first window, but also be turned off according to the closing of the first window. Thereby the power consumption of the image collecting components and the burden on image processing of the electronic apparatus can be further saved.

Figure 2:
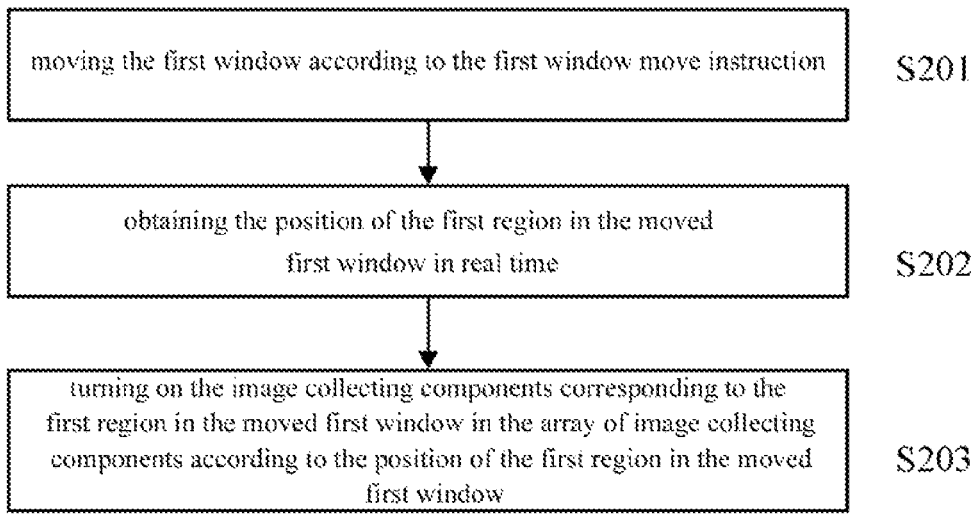
FIG. 2 is a flowchart depicting a method of controlling turning on of the related image collecting components in an array of image collecting components with the movement of the first window, after the control method shown in FIG. 1, according to one embodiment of the present invention.

Furthermore, on the other hand, the user is not always in a stationary state when viewing the window and he/she may move his/her own position, and in order to facilitate the viewing, the user may operate the window to move the display position of the window. In this situation, it may cause the collecting components turned on according to the position of the first region when the first window is initially displayed unable to collect the image desired by the user. Therefore, according to another example of the present invention, after the method 100 described in FIG. 1, it is also possible to move the first window according to a first window move instruction, and turn on the related image collecting components in the array of image collecting components according to the moved first window. FIG. 2 is a flowchart depicting a method 200 of controlling turning on of the related image collecting components in an array of image collecting components with the movement of the first window, after the control method 100 shown in FIG. 1, according to one embodiment of the present invention.

As shown in FIG. 2, in step S201, the first window is moved according to the first window move instruction. According to one example of the present invention, a first window move instruction may be received from a user before moving the first window according to the first window move instruction.

Alternatively, according to another example of the present invention, prior to moving the first window according to the first window move instruction, the following steps may be also comprised: recognizing a collected object in the first image after obtaining the first image; determining the position of the collected object in the first image; and generating a first window move instruction when the position of the collected object in the first image exceeds a predetermined range. For example, the collected object may be a user viewing the first window, and it may be determined in advance that in the collected first image, the user should be at an intermediate region of the first image. The position of the user viewing the first window in the first image may be determined by image recognition, and the first window move instruction may be generated when the position of the user in the first image exceeds a predetermined intermediate region of the first image. More specifically, the moving direction of the first window may be determined according to the position of the user in the first image, and thereby generating a corresponding first window move instruction.

In step S202, the position of the first region in the moved first window is obtained in real time. Then, in step S203, the image collecting components corresponding to the first region in the moved first window in the array of image collecting components are turned on according to the position of the first region in the moved first window.

Via the method provided by this embodiment, when the position of the first window being viewed by the user moves, the corresponding image collecting components in the array of image collecting components can be turned on according to the moved position of the first window.

Furthermore, as described above, it is possible to turn off the image collecting components corresponding to the free region in the array of image collecting components while turning on the corresponding image collecting components in the array of image collecting components according to the moved position of the first window.

In addition, according to another example of the present invention, touch operations performed by an operating body on the display screen may also be detected by the image collecting components. In particular, FIG. 3 shows a flowchart depicting a method 300 of detecting touch operations of the user in the first window by the array of image collecting components.

Figure 3:
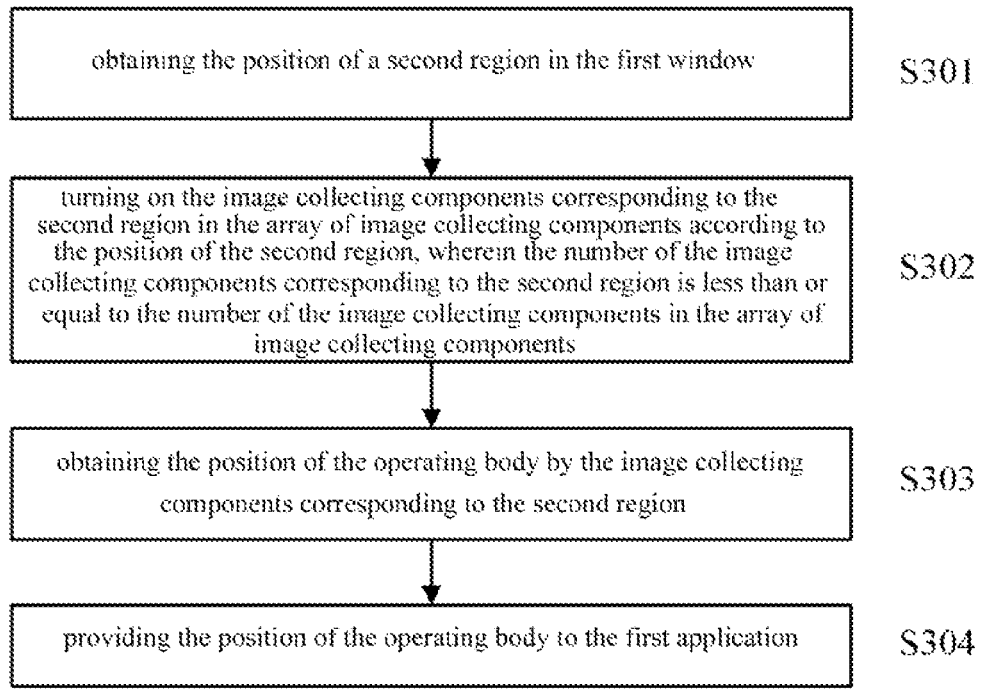
FIG. 3 is a flowchart depicting a method of detecting touch operations of the user in the first window by the array of image collecting components.

As shown in FIG. 3, in step S301, the position of a second region in the first window is obtained. As described above, according to one example of the present invention, the first window may include an image display region and a function selection region, and the first region may be the image display region in the first window, and the second region may be the function selection region in the first window.

In step S302, the image collecting components corresponding to the second region in the array of image collecting components are turned on according to the position of the second region, wherein the number of the image collecting components corresponding to the second region is less than or equal to the number of the image collecting components in the array of image collecting components. According to one example of the present invention, the first region and the second region may be two different and non-overlapping regions in the first window. Alternatively, the first region and the second region may totally or partially overlap. In the case when the first region and the second region at least partially overlap, when an operating body such as the user's finger is operating in the overlapping region on the display screen, it is also possible to determine the position of the finger by recognizing the user's finger in the first image while obtaining the first image by the array of image collecting components.

In step S303, the position of the operating body is obtained by the image collecting components corresponding to the second region. Finally, in step S304, the position of the operating body is provided to the first application. Accordingly, the first application can determine a corresponding function option according to the position of the operating body and then perform the function.

Via the control method provided by this embodiment, the corresponding image collecting components in the array of image collecting components can be turned on according to the first window being viewed by the user, and thus the first image corresponding to the first window and the touch input corresponding to the first window can be collected by the array of image collecting components.

Steps of the method 300 shown in FIG. 3 may be performed in parallel to step S102 to step S105 shown in FIG. 1. However, the present invention is not limited thereto, for example, obtaining the position of the first region in the first window and turning on the image collecting components corresponding to the first region in the array of image collecting components according to the position of the first region (i.e., Step S102 and step S103) may be performed first, and then obtaining the position of the second region in the first window and turning on the image collecting components corresponding to the second region in the array of image collecting components according to the position of the second region as shown in FIG. 3 (i.e., steps S301 and S302) may be performed. Thereafter, obtaining the first image by the image collecting components corresponding to the first region and providing the first image to the first application to which the first window corresponds (i.e., step 104 and step S105) and obtaining the position of the operating body by the image collecting components corresponding to the first region and providing the position of the operating body to the first application to the first application (i.e., step 303 and step S304) may be performed in parallel.

Figure 4:
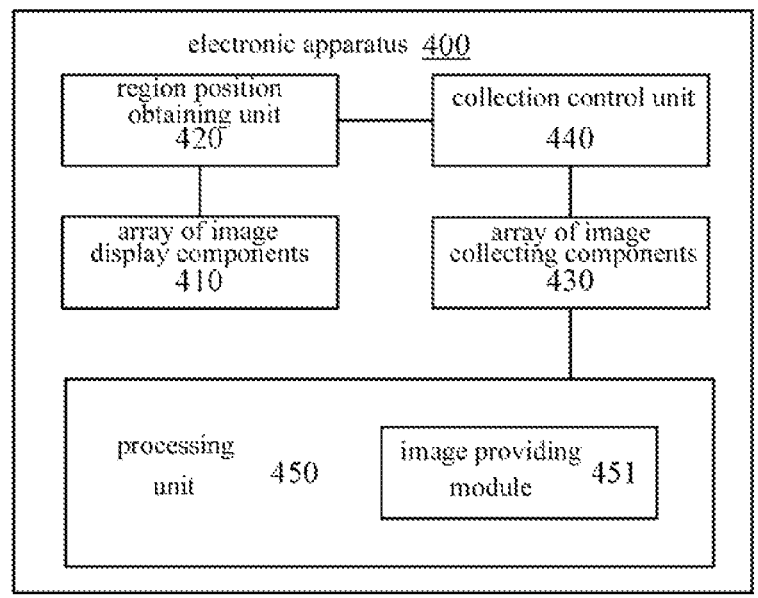
FIG. 4 is an exemplary structural block diagram showing an electronic apparatus according to one embodiment of the present invention.

Hereinafter, an electronic apparatus of one embodiment of the present invention is illustrated with reference to FIG. 4. FIG. 4 is an exemplary structural block diagram showing an electronic apparatus 400 according to one embodiment of the present invention. As shown in FIG. 4, the electronic apparatus of this embodiment may include an array of image display components 410, a region position obtaining unit 420, an array of image collecting components 430, a collection control unit 440, and a processing unit 450. The respective units of the electronic apparatus 400 perform the various steps/functions of the display method in the above FIG. 1, and thus for the sake of conciseness, no more details are described.

For example, the array of image display components 410 may display a first window. According to one example of the present invention, the first window may correspond to a first application installed on an electronic apparatus. The position of a first region in the first window may be obtained by the region position obtaining unit 420. The first region may be less than or equal to the display region of the first window. For example, the first window may include an image display region and a function selection region, and the first region may be the image display region in the first window.

The array of image collecting components 430 may be set in correspondence with the array of image display components 410 along a direction perpendicular to the screen of the electronic apparatus. According to one example of the present invention, the array of image display components and the array of image collecting components may be set in the same plane in a direction perpendicular to the screen of the electronic apparatus. For example, the image display components and the image collecting components may be set alternately every other row and/or every other column within a transparent housing of the display screen. In this way, the image collecting components can collect the image of the user who is viewing the displayed contents while the image display components are displaying images.

Alternatively, according to another example of the present invention, the array of image display components and the array of image collecting components may be set in different planes in a direction perpendicular to the screen of the electronic apparatus. For example, the array of image display components may be set near the screen housing of the electronic apparatus, and the array of image collecting components may be set behind the plane where the array of image display components is set and along a direction perpendicular to the screen of the electronic apparatus. In this situation, the image display components in the array of image display components can be switched between a turned-on state and a turned-off state with a predetermined frequency. When the image display components are turned off, the image collecting components in the array of image collecting components can be turned on so as to facilitate the image collection through the transparent housing of the screen.

The collection control unit 440 may turn on the image collecting components corresponding to the first region in the array of image collecting components 430 according to the position of the first region, wherein the number of the image collecting components corresponding to the first region is less than or equal to the number of the image collecting components in the array of image collecting components. According to one example of the present invention, when the array of image display components and the array of image collecting components are set in the same plane in a direction perpendicular to the screen of the electronic apparatus, the image collecting components corresponding to the first region may include the components located within the display range of the first window; whereas when the array of image display components and the array of image collecting components are set in different planes in a direction perpendicular to the screen of the electronic apparatus, the image collecting components corresponding to the first region may include the image collecting components within a range corresponding to the display region of the first window in the array of image collecting components.

In addition, according to another example of the present invention, the apparatus may comprise a second receiving unit, which may receive an image collecting instruction. The collection control unit 440 may turn on the image collecting components corresponding to the first region in the array of image collecting components 430 according to the image collecting instruction and based on the position of the first region.

A first image may be obtained by the image collecting components corresponding to the first region in the array of image collecting components 430. The processing unit 450 may include an image providing module 451. The image providing module 451 may provide the first image to a first application to which the first window corresponds. According to one example of the present invention, the first application may be instant communication applications capable of performing video transmission, or other applications supporting an image collection function or capable of processing the collected image.

Via the electronic apparatus provided by this embodiment, there is no need to turn on all the components in the array of image collecting components when turning on the apparatus, instead, only the corresponding image collecting components in the array of image collecting components are to be turned on according to the window being viewed by the user, thereby reducing the power consumed by the array of image collecting components and effectively decreasing the transmitted data amount while maintaining the image resolution.

According to one example of the present invention, the electronic apparatus shown in FIG. 4 may further comprise a free region determining unit, which may determine a free region that displays no window in the array of image collecting components, and turn off the image collecting components corresponding to the free region in the array of image collecting components. For example, the free region determining unit may determine the free region that displays no window in the array of image collecting components with a predetermined time interval. Further, when the first window is closed, the collection control unit 440 may turn off the image collecting components corresponding to the first region in the first window, so that the image collecting components are able to not only be turned on according to the opening of the first window, but also be turned off according to the closing of the first window. Thereby the power consumption of the image collecting components and the burden on image processing of the electronic apparatus can be further saved.

Figure 5:
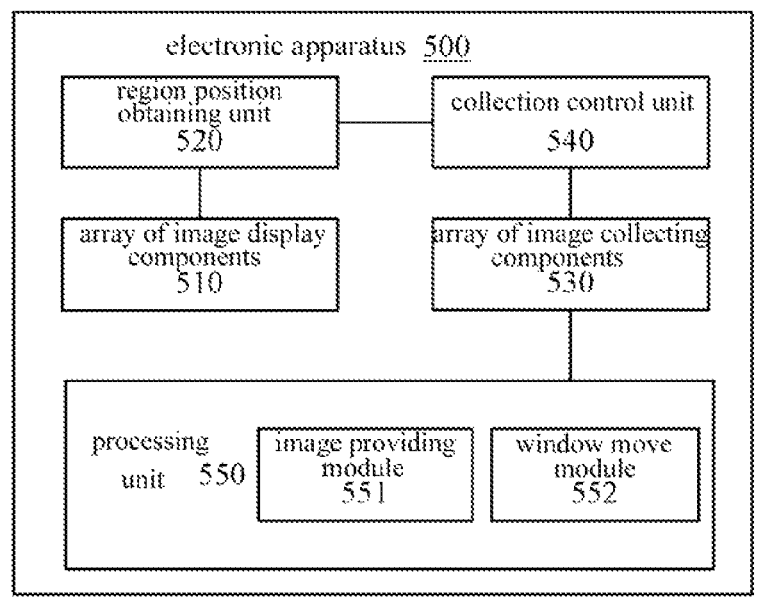
FIG. 5 is an exemplary structural block diagram showing an electronic apparatus according to another embodiment of the present invention.

Furthermore, on the other hand, the user is not always in a stationary state when viewing the window and he/she may move his/her own position, and in order to facilitate the viewing, the user may operate the window to move the display position of the window. In this situation, it may cause the collecting components turned on according to the position of the first region when the first window is initially displayed unable to collect the image desired by the user. Therefore, according to another embodiment of the present invention, it is also possible to move the first window according to a first window move instruction, and turn on the related image collecting components in the array of image collecting components according to the moved first window. Hereinafter, a display apparatus according to another embodiment of the present invention is described with reference to FIG. 5. FIG. 5 is an exemplary structural block diagram showing an electronic apparatus 500 according to another embodiment of the present invention.

As shown in FIG. 5, similar to the electronic apparatus 400, the electronic apparatus 500 includes an array of image display components 510, a region position obtaining unit 520, an array of image collecting components 530, a collection control unit 540, and a processing unit 550. The array of image display components 510 may display a first window. The position of a first region in the first window may be obtained by the region position obtaining unit 520. The array of image collecting components 530 may be set in correspondence with the array of image display components 510 along a direction perpendicular to the screen of the electronic apparatus. The collection control unit 540 may turn on the image collecting components corresponding to the first region in the array of image collecting components according to the position of the first region, and a first image may be obtained by the image collecting components corresponding to the first region in the array of image collecting components 530. The processing unit 550 may include an image providing module 551, which may provide the first image to a first application to which the first window corresponds.

In addition, the processing unit 550 in the electronic apparatus 500 in this embodiment may further include a window move module 552, which may move the first window according to a first window move instruction. According to one example of the present invention, the electronic apparatus may further comprise a first receiving unit. A first window move instruction may be received by the first receiving unit from a user before moving the first window according to the first window move instruction. According to the requirements of a specific design, the first receiving unit and the aforementioned second receiving unit may be two independent sections. Alternatively, the first receiving unit and the abovementioned second receiving unit may also be combined together or implemented by one section.

Alternatively, according to another example of the present invention, an image recognizing module, a determining module, and an instruction generating module may be comprised. A collected object in the first image may be recognized by the image recognizing module that is configured for recognition after obtaining the first image. For example, the collected object may be a user viewing the first window. The determining module may determine the position of the collected object in the first image. For example, the determining module may determine the position of the user viewing the first window in the first image via image recognition. The instruction generating module may generate a first window move instruction when the position of the collected object in the first image exceeds a predetermined range. For example, it may be determined in advance that in the collected first image, the user should be at an intermediate region of the first image. The instruction generating module may generate the first window move instruction when the position of the user in the first image exceeds a predetermined intermediate region of the first image. More specifically, the determining module may determine the moving direction of the first window according to the position of the user in the first image, and thereby the instruction generating module may generate a corresponding first window move instruction.

The region position obtaining unit 520 may also obtain the position of the first region in the moved first window in real time. The collection control unit 540 may also turn on the image collecting components corresponding to the first region in the moved first window in the array of image collecting components 530 according to the position of the first region in the moved first window.

Via the electronic apparatus provided by this embodiment, when the position of the first window being viewed by the user moves, the corresponding image collecting components in the array of image collecting components can be turned on according to the moved position of the first window.

Figure 6:
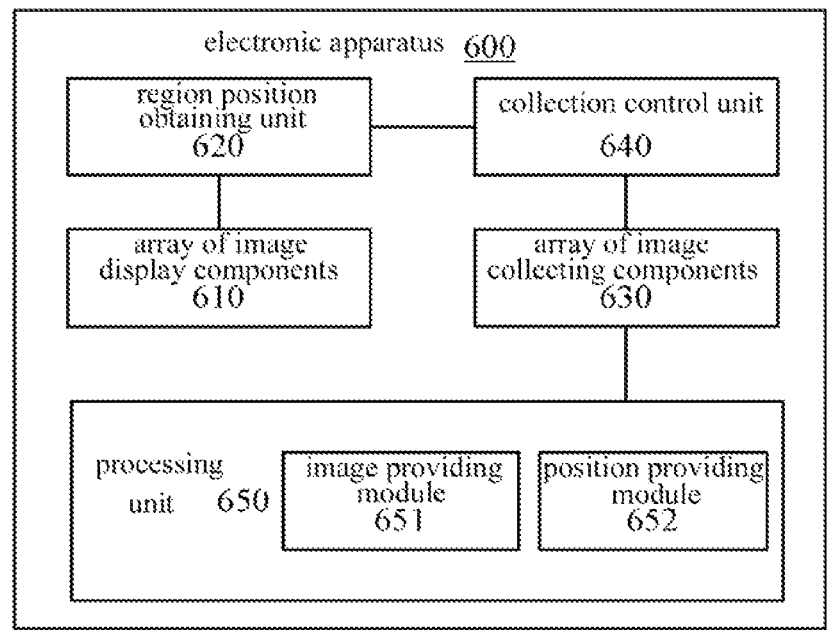
FIG. 6 is an exemplary structural block diagram showing an electronic apparatus according to still another embodiment of the present invention.

In addition, according to still another example of the present invention, touch operations performed by an operating body on the display screen may also be detected by the image collecting components. Hereinafter, a display apparatus according to still another embodiment of the present invention is described with reference to FIG. 6. FIG. 6 is an exemplary structural block diagram showing an electronic apparatus 600 according to still another embodiment of the present invention.

As shown in FIG. 6, similar to the electronic apparatus 400, the electronic apparatus 600 includes an array of image display components 610, a region position obtaining unit 620, an array of image collecting components 630, a collection control unit 640, and a processing unit 650. The array of image display components 610 may display a first window. The position of a first region in the first window may be obtained by the region position obtaining unit 620. The array of image collecting components 630 may be set in correspondence with the array of image display components 610 along a direction perpendicular to the screen of the electronic apparatus. The collection control unit 640 may turn on the image collecting components corresponding to the first region in the array of image collecting components according to the position of the first region, and a first image may be obtained by the image collecting components corresponding to the first region in the array of image collecting components 630. The processing unit 650 may include an image providing module 651, which may provide the first image to a first application to which the first window corresponds.

In addition, in this embodiment, the region position obtaining unit 620 may also obtain the position of a second region in the first window. As described above, according to one example of the present invention, the first window may include an image display region and a function selection region, and the first region may be the image display region in the first window, and the second region may be the function selection region in the first window.

The collection control unit 640 may also turn on the image collecting components corresponding to the second region in the array of image collecting components according to the position of the second region, wherein the number of the image collecting components corresponding to the second region is less than or equal to the number of the image collecting components in the array of image collecting components. According to one example of the present invention, the first region and the second region may be two different and non-overlapping regions in the first window. Alternatively, the first region and the second region may totally or partially overlap. In the case when the first region and the second region at least partially overlap, when an operating body such as the user's finger is operating in the overlapping region on the display screen, it is also possible to determine the position of the finger by recognizing the user's finger in the first image while obtaining the first image by the array of image collecting components.

The array of image collecting components 630 may also obtain the position of the operating body by the image collecting components corresponding to the second region. Further, the processing unit 650 may also include a position providing module 652, which may provide the position of the operating body to the first application.

Via the electronic apparatus provided by this embodiment, the corresponding image collecting components in the array of image collecting components can be turned on according to the first window being viewed by the user, and thus the first image corresponding to the first window and the touch input corresponding to the first window can be collected by the array of image collecting components.

In addition, the mode of receiving user's touch input in the present invention is not limited thereto, and according to another example of the present invention, the electronic apparatus may also comprise a touch sensing unit set to overlap with the screen to detect touch operations performed by an operating body.

Figure 7:
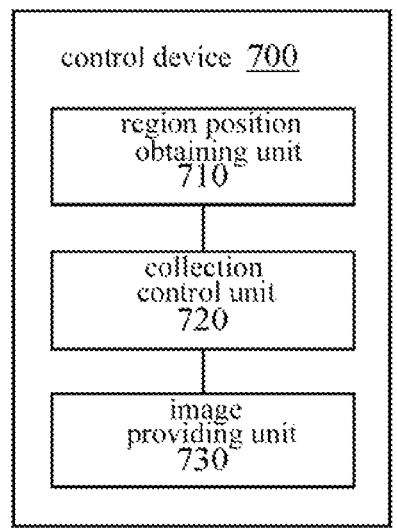
FIG. 7 is an exemplary structural block diagram showing a control device according to one embodiment of the present invention.

Hereinafter, a control device of one embodiment of the present invention is illustrated with reference to FIG. 7. FIG. 7 is an exemplary structural block diagram showing a control device 700 according to one embodiment of the present invention. The control device 700 may be used for an electronic apparatus comprising an array of display components and an array of image collecting components. In particular, the electronic apparatus in this embodiment comprises an array of image display components and an array of image collecting components set in correspondence with each other along a direction perpendicular to the screen of the electronic apparatus.

According to one example of the present invention, the array of image display components and the array of image collecting components may be set in the same plane in a direction perpendicular to the screen of the electronic apparatus. For example, the image display components and the image collecting components may be set alternately every other row and/or every other column within a transparent housing of the display screen. In this way, the image collecting components can collect the image of the user who is viewing the displayed contents while the image display components are displaying images.

Alternatively, according to another example of the present invention, the array of image display components and the array of image collecting components may be set in different planes in a direction perpendicular to the screen of the electronic apparatus. For example, the array of image display components may be set near the screen housing of the electronic apparatus, and the array of image collecting components may be set behind the plane where the array of image display components is set and along a direction perpendicular to the screen of the electronic apparatus. In this situation, the image display components in the array of image display components can be switched between a turned-on state and a turned-off state with a predetermined frequency. When the image display components are turned off, the image collecting components in the array of image collecting components can be turned on so as to facilitate the image collection through the transparent housing of the screen.

In this embodiment, the first window may be displayed by the array of image display components. As shown in FIG. 7, the control device 700 may include a region position obtaining unit 710, a collection control unit 720, and an image providing unit 730.

The region position obtaining unit 710 may obtain the position of a first region in the first window. The first region may be less than or equal to the display region of the first window. For example, the first window may include an image display region and a function selection region, and the first region may be the image display region in the first window.

The collection control unit 720 may turn on the image collecting components corresponding to the first region in the array of image collecting components according to the position of the first region. As described above, the first region may be less than or equal to the display region of the first window. Accordingly, the number of the image collecting components corresponding to the first region is less than or equal to the number of the image collecting components in the array of image collecting components. According to one example of the present invention, when the array of image display components and the array of image collecting components are set in the same plane in a direction perpendicular to the screen of the electronic apparatus, the image collecting components corresponding to the first region may include the components located within the display range of the first window; whereas when the array of image display components and the array of image collecting components are set in different planes in a direction perpendicular to the screen of the electronic apparatus, the image collecting components corresponding to the first region may include the image collecting components within a range corresponding to the display region of the first window in the array of image collecting components.

After turning on the image collecting components corresponding to the first region in the array of image collecting components according to the position of the first region, the collection control unit 720 may obtain the first image by the image collecting components corresponding to the first region.

The image providing unit 730 may provide the first image obtained by the image collecting components corresponding to the first region to a first application to which the first window corresponds. According to one example of the present invention, the first application may be instant communication applications capable of performing video transmission, or other applications supporting an image collection function or capable of processing the collected image.

Via the control device provided by this embodiment, there is no need to turn on all the components in the array of image collecting components when turning on the electronic apparatus, instead, only the corresponding image collecting components in the array of image collecting components are to be turned on according to the window being viewed by the user, thereby reducing the power consumed by the array of image collecting components and effectively decreasing the transmitted data amount while maintaining the image resolution.

Next, a method of controlling image collection and a corresponding electronic apparatus according to an embodiment of the present invention will be described in detail with reference to FIGS. 8 to 13.

Figure 8:
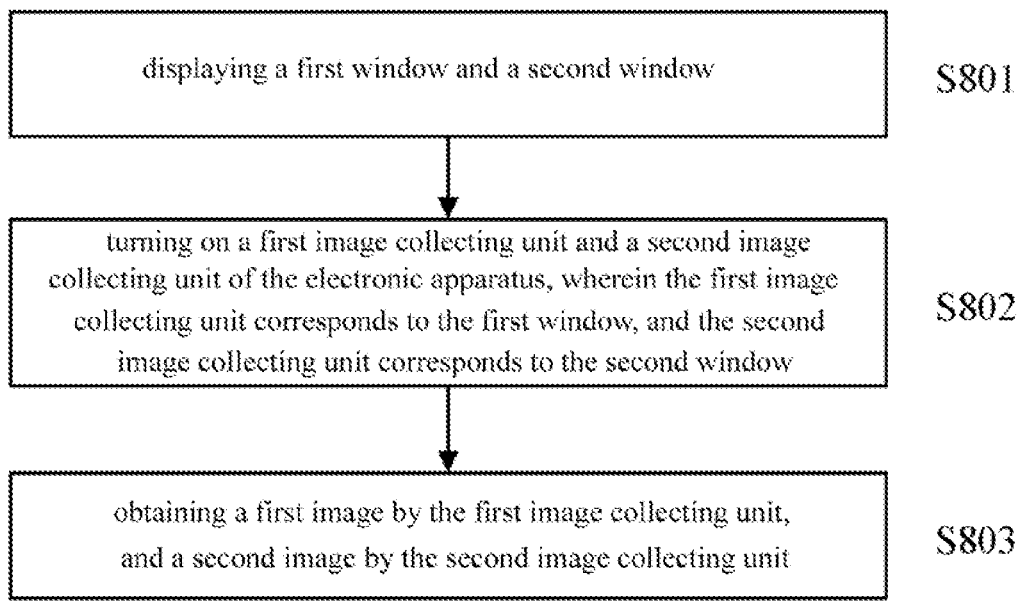
FIG. 8 is a flowchart depicting a method of controlling the image collection according to one embodiment of the present invention.

FIG. 8 is a flowchart depicting a method 800 of controlling the image collection according to one embodiment of the present invention. The method 800 of controlling the image collection may be used for an electronic apparatus includes a display unit and an image collecting unit. The specific form of the electronic apparatus includes but is not limited to mobile telephones, personal computers, digital cameras, personal digital assistants, portable computers, game consoles, etc.

A method of controlling the image collection according to an embodiment of the present invention is to be described below with reference to FIG. 8. As shown in FIG. 8, in step S801, a first window and a second window are displayed. According to one example of the present invention, the first window may correspond to a first application installed on an electronic apparatus, while the second window may correspond to a second application installed on the electronic apparatus. Further, according to another example of the present invention, the electronic apparatus may include one display screen, on which a first window and a second window are displayed. Alternatively, the electronic apparatus may also include a first display screen and a second display screen provided on two different surfaces thereof.

And the first window may be displayed on the first display screen, and the second window may be displayed on the second display screen.

In addition, according to another example of the present invention, the display region of the first window is set to not overlap with the display region of the second window, and the first window and the second window are displayed in accordance with the setting.

Then, in step S802, a first image collecting unit and a second image collecting unit of the electronic apparatus are turned on, wherein the first image collecting unit corresponds to the first window, and the second image collecting unit corresponds to the second window. According to one example of the present invention, the electronic apparatus may include one display screen, the first image collecting unit and the second image collecting unit may be cameras located on the left and right sides of the display screen. The correspondence of the first window and the second window with the first image collecting unit and the second image collecting unit may be determined according to the display positions of the first window and the second window on the screen. For example, when the first window is displayed in the left side of the display screen and the second window is displayed in the right side of the display screen, the first window may correspond to the camera set in the left side of the display screen, and the second window may correspond to the camera set in the right side of the display screen, and vise visa. Alternatively, according to another example of the present invention, in the case that the electronic apparatus comprises a first display screen and a second display screen provided on two different surfaces thereof, the first image collecting unit may be set on the first surface on which the first display screen is located, while the second image collecting unit may be set on the second surface on which the second display screen is located. Thus, the first image collecting unit may correspond to the first window displayed on the first display screen, and the second image collecting unit may correspond to the second window displayed on the second display screen.

Then, in step S803, a first image is obtained by the first image collecting unit, and a second image is obtained by the second image collecting unit. Finally, in step S804, the first image is provided to the first application to which the first window corresponds, and the second image is provided to a second application to which the second window corresponds according to the correspondence between the image collecting units and the windows. According to one example of the present invention, the first application and the second application may be instant communication applications capable of performing video transmission, or other applications supporting an image collection function or capable of processing the collected image.

In addition, according to another example of the present invention, the first application and the second application may be different applications. For example, the first application and the second application may be two different instant communication applications. Alternatively, the first application and the second application may be the same application, but the first window and the second window may correspond to the different processes of the same application.

Via the method of controlling image collection provided by this embodiment, images collected by a plurality of image collecting units can be provided to applications to which a plurality of windows in one electronic apparatus correspond, so that the multiple window processes can independently perform an operation such as a video call or the like, which brings convenience to use of the users.

Figure 9:
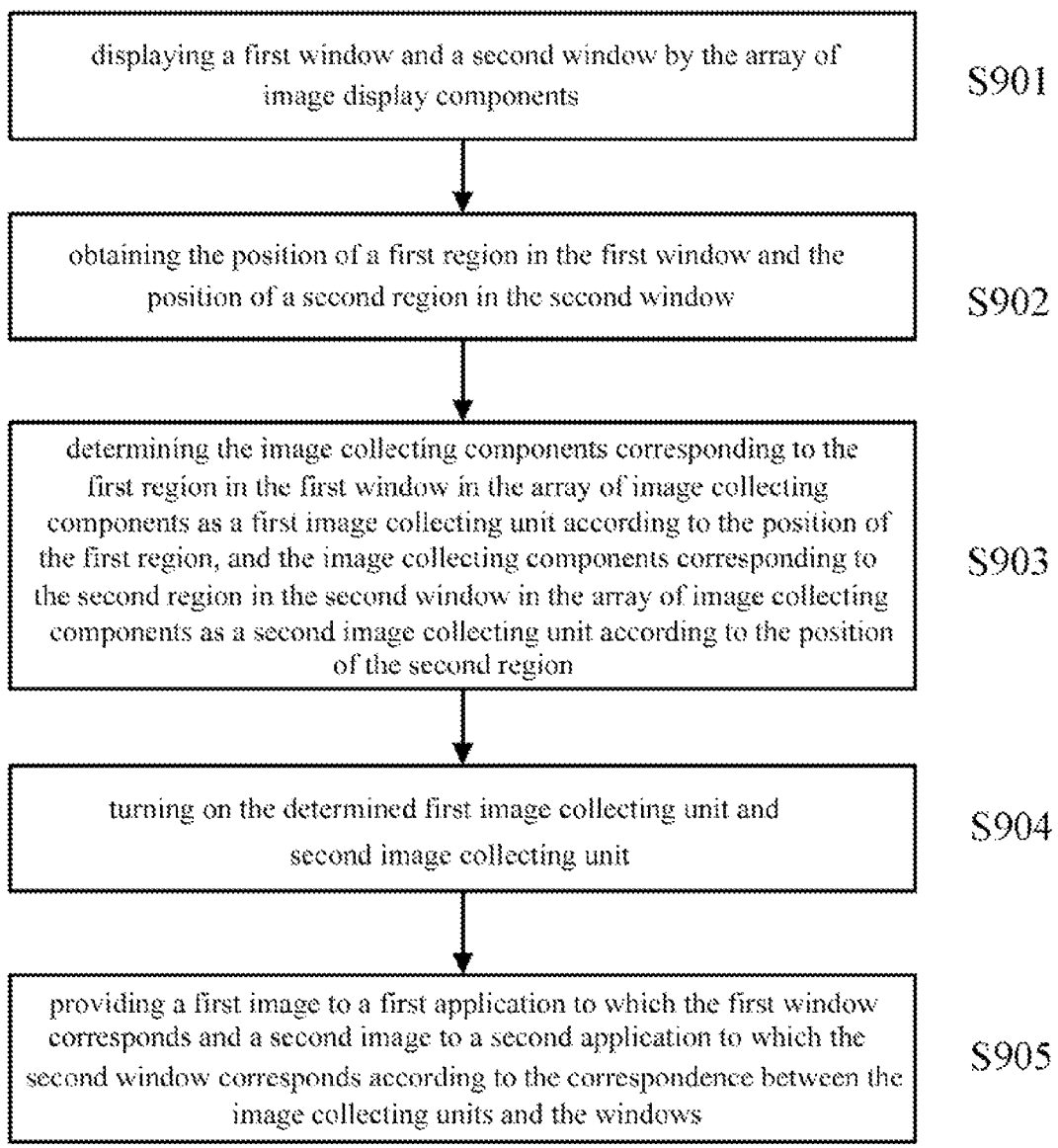
FIG. 9 is a flowchart depicting a method of controlling the image collection according to another embodiment of the present invention.

As described in the above embodiments, the display unit may be a camera. However, the present invention is not limited thereto. FIG. 9 is a flowchart depicting a method 900 of controlling the image collection according to another embodiment of the present invention. The method 900 shown in FIG. 9 is one example of the method 800 shown in FIG. 8. The method 900 of controlling the image collection may be applied to an electronic apparatus comprising an array of image display components and an array of image collecting components set in correspondence with each other along a direction perpendicular to the screen of the electronic apparatus.

According to one example of the present invention, the array of image display components and the array of image collecting components may be set in the same plane in a direction perpendicular to the screen of the electronic apparatus. For example, the image display components and the image collecting components may be set alternately every other row and/or every other column within a transparent housing of the display screen. In this way, the image collecting components can collect the image of the user who is viewing the displayed contents while the image display components are displaying images.

Alternatively, according to another example of the present invention, the array of image display components and the array of image collecting components may be set in different planes in a direction perpendicular to the screen of the electronic apparatus. For example, the array of image display components may be set near the screen housing of the electronic apparatus, and the array of image collecting components may be set behind the plane where the array of image display components is set and along a direction perpendicular to the screen of the electronic apparatus. In this situation, the image display components in the array of image display components can be switched between a turned-on state and a turned-off state with a predetermined frequency. When the image display components are turned off, the image collecting components in the array of image collecting components can be turned on so as to facilitate the image collection through the transparent housing of the screen.

As shown in FIG. 9, in step S901, a first window and a second window are displayed by the array of image display components. Then, in step S902, the position of a first region in the first window is obtained, and the position of a second region in the second window is obtained. The first region may be less than or equal to the display region of the first window, and the second region may be less than and equal to the display region of the second window.

In step S903, the image collecting components corresponding to the first region in the first window in the array of image collecting components are determined as a first image collecting unit according to the position of the first region, and the image collecting components corresponding to the second region in the second window in the array of image collecting components are determined as a second image collecting unit according to the position of the second region.

As described above, the first region may be less than or equal to the display region of the first window. Accordingly, the number of the image collecting components corresponding to the first region is less than or equal to the number of the image collecting components in the array of image collecting components. Similarly, the number of the image collecting components corresponding to the second region is less than or equal to the number of the image collecting components in the array of image collecting components.

According to one example of the present invention, when the array of image display components and the array of image collecting components are set in the same plane in a direction perpendicular to the screen of the electronic apparatus, the image collecting components corresponding to the first region may include the components within the display region of the first window, and the image collecting components corresponding to the second region may include the components within the display region of the second window; whereas when the array of image display components and the array of image collecting components are set in different planes in a direction perpendicular to the screen of the electronic apparatus, the image collecting components corresponding to the first region may include the image collecting components within a range corresponding to the display region of the first window in the array of image collecting components, and the image collecting components corresponding to the second region may include the image collecting components within a range corresponding to the display region of the second window in the array of image collecting components.

In addition, according to another example of the present invention, an image collecting instruction may be received. And in step S903, according to the image collecting instruction, the image collecting components corresponding to the first region in the first window in the array of image collecting components are determined as the first image collecting unit based on the position of the first region, and the image collecting components corresponding to the second region in the second window in the array of image collecting components are determined as the second image collecting unit based on the position of the second region.

In step S904, the determined first image collecting unit and second image collecting unit are turned on. Then, in step S905, a first image is provided to a first application to which the first window corresponds and a second image is provided to a second application to which the second window corresponds according to the correspondence between the image collecting units and the windows.

Via the method provided by this embodiment, not only that images collected by a plurality of image collecting units can be provided to applications to which a plurality of windows in one electronic apparatus correspond so that the multiple window processes can independently perform an operation such as a video call or the like, but also there is no need to turn on all the components in the array of image collecting components when turning on the apparatus, instead, only the corresponding image collecting components in the array of image collecting components are to be turned on according to the window being viewed by the user, thereby reducing the power consumed by the array of image collecting components and effectively decreasing the transmitted data amount while maintaining the image resolution.

According to one example of the present invention, the first region and the second region may display a first image and a second image, respectively. Alternatively, the contents displayed in the first region and the second region may be independent of the images collected by the first image collecting unit and the second image collecting unit. For example, when the first application to which the first window corresponds is an instant communication application, it is possible to display the image of the counter party in communication with the user using the current electronic apparatus in the first region. Since the user is viewing the image of the counter party in communication in the first region during a video call, it is possible to collect the front view image of the user by the image collecting components corresponding to the first region so as to transmit the same to the counter party in communication. In addition, when the first application to which the first window corresponds is an instant communication application, in addition to the first region, the first window may further include a local image viewing region to display the first image collected by the first image collecting unit. Similar to the first window, second window may also include a local image viewing region to display the second image, detailed omitted herein for brevity.

In addition, according to another example of the present invention, the method shown in FIG. 9 may further comprise determining a free region that displays no window in the array of image collecting components, and turning off the image collecting components corresponding to the free region in the array of image collecting components. For example, the free region that displays no window in the array of image collecting components may be determined with a predetermined time interval. Further, when the first window and/or the second window is closed, the image collecting components corresponding to the first region in the first window and/or the second region in the second window may be turned off. Thereby the power consumption of the image collecting components and the burden on image processing of the electronic apparatus can be further saved.

Figure 10:
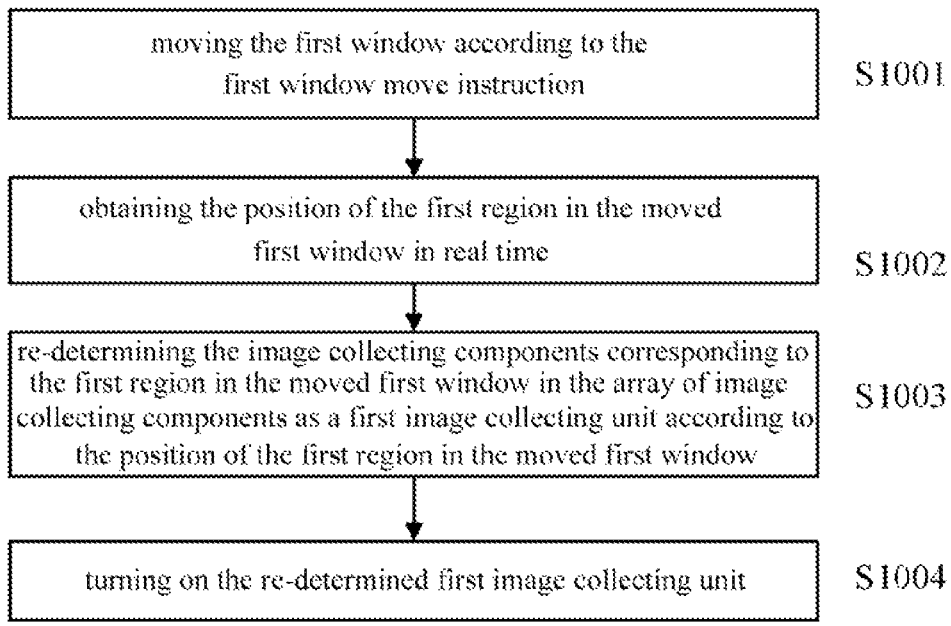
FIG. 10 is a flowchart depicting a method of controlling turning on of the related image collecting components in an array of image collecting components with the movement of the first window, after the method of controlling the image collection shown in FIG. 9, according to one embodiment of the present invention.

Furthermore, on the other hand, the user is not always in a stationary state when viewing the window and he/she may move his/her own position, and in order to facilitate the viewing, the user may operate the window to move the display position of the window. In this situation, it may cause the collecting components turned on according to the position of the first region when the first window is initially displayed unable to collect the image desired by the user. Therefore, according to another example of the present invention, after the method 900 described in FIG. 9, it is also possible to move the first window according to a first window move instruction, and turn on the related image collecting components in the array of image collecting components according to the moved first window. FIG. 10 is a flowchart depicting a method 1000 of controlling turning on of the related image collecting components in an array of image collecting components with the movement of the first window, after the method 900 of controlling the image collection shown in FIG. 9, according to one embodiment of the present invention.

As shown in FIG. 10, in step S1001, the first window is moved according to the first window move instruction. According to one example of the present invention, a first window move instruction may be received from a user before moving the first window according to the first window move instruction.

Alternatively, according to another example of the present invention, prior to moving the first window according to the first window move instruction, the following steps may be also comprised: recognizing a collected object in the first image after obtaining the first image; determining the position of the collected object in the first image; and generating a first window move instruction when the position of the collected object in the first image exceeds a predetermined range. For example, the collected object may be a user viewing the first window, and it may be determined in advance that in the collected first image, the user should be at an intermediate region of the first image. The position of the user viewing the first window in the first image may be determined by image recognition, and the first window move instruction may be generated when the position of the user in the first image exceeds a predetermined intermediate region of the first image. More specifically, the moving direction of the first window may be determined according to the position of the user in the first image, and thereby generating a corresponding first window move instruction.

In step S1002, the position of the first region in the moved first window is obtained in real time. Then, in step S1003, the image collecting components corresponding to the first region in the moved first window in the array of image collecting components are re-determined as a first image collecting unit according to the position of the first region in the moved first window. Then, in step S1004, the re-determined first image collecting unit is turned on.

Via the method provided by this embodiment, when the position of the first window being viewed by the user moves, the corresponding image collecting components in the array of image collecting components can be turned on according to the moved position of the first window.

Furthermore, as described above, it is possible to turn off the image collecting components corresponding to the free region in the array of image collecting components while turning on the corresponding image collecting components in the array of image collecting components according to the moved position of the first window.

It should be noted that in the embodiments of the present invention, the terms "first window" and "second window" are used to only distinguish between different windows, rather than indicating a specific one. That is to say, the objects denoted by the first window and the second window may be interchangable, and solutions obtained after the interchanging are also within scope of embodiments of the present invention. For instance, the method shown in FIG. 10 may also be used for the second window.

In addition, according to another example of the present invention, when the display region of the moved first window at least partially overlaps with the display region of the second window, the method of FIG. 10 may further comprise: merging the first window and the second window into a third window; obtaining the position of a third region in the third window; determining the image collecting components corresponding to the third region in the third window in the array of image collecting components as a third image collecting unit according to the position of the third region; turning on the determined third image collecting unit; obtaining a third image by the third image collecting unit; and providing the third image respectively to the first application to which the first window corresponds and the second application to which the second window corresponds. According to one example of the present invention, when turning on the determined third image collecting unit, the image collecting components that correspond to the first region or the second region before the merging but do not correspond to the third region may be turned off.

Via the method provided by this embodiment, images collected by a plurality of image collecting units can be provided to a plurality of applications to which one window in one electronic apparatus corresponds, so that operations such as a video call or the like can be performed via the plurality of applications.

Figure 11:
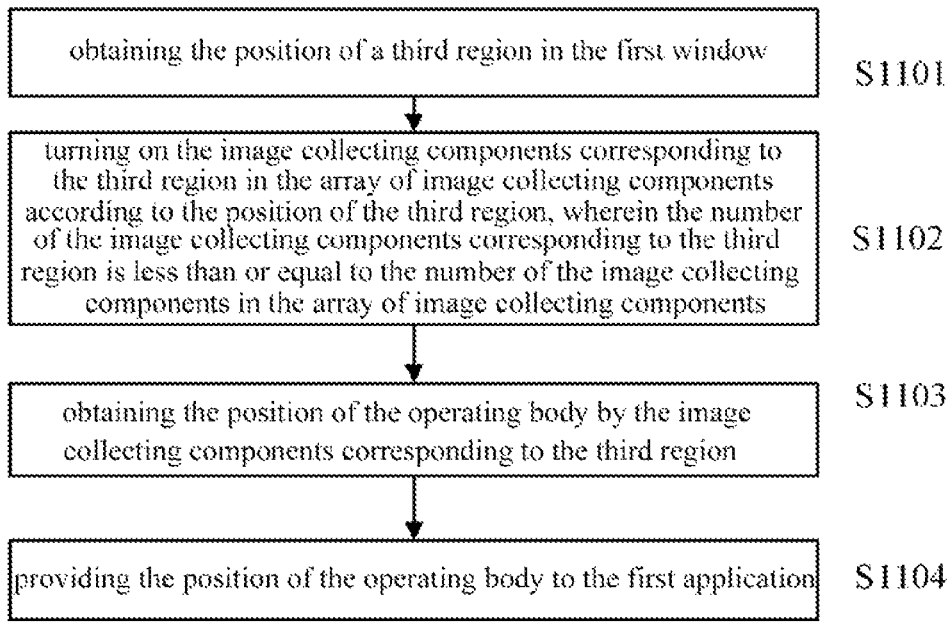
FIG. 11 is a flowchart showing a method of detecting touch operations of the user in the first window by the array of image collecting components.

In addition, according to another example of the present invention, touch operations performed by an operating body on the display screen may also be detected by the image collecting components. In particular, FIG. 11 is a flowchart showing a method 1100 of detecting touch operations of the user in the first window by the array of image collecting components. As described above, in the embodiments of the present invention, the objects denoted by the first window and the second window may be interchangable, that is to say, the method shown in FIG. 11 may also be used for the second window.

As shown in FIG. 11, in step S1101, the position of a third region in the first window is obtained. According to one example of the present invention, the first window may include an image display region and a function selection region, and the first region may be the image display region in the first window, and the third region may be the function selection region in the first window.

In step S1102, the image collecting components corresponding to the third region in the array of image collecting components are turned on according to the position of the third region, wherein the number of the image collecting components corresponding to the third region is less than or equal to the number of the image collecting components in the array of image collecting components. According to one example of the present invention, the first region and the third region may be two different and non-overlapping regions in the first window. Alternatively, the first region and the third region may totally or partially overlap. In the case when the first region and the third region at least partially overlap, when an operating body such as the user's finger is operating in the overlapping region on the display screen, it is also possible to determine the position of the finger by recognizing the user's finger in the first image while obtaining the first image by the array of image collecting components.

In step S1103, the position of the operating body is obtained by the image collecting components corresponding to the third region. Finally, in step S1104, the position of the operating body is provided to the first application. Accordingly, the first application can determine a corresponding function option according to the position of the operating body and then perform the function.

Via the method provided by this embodiment, the corresponding image collecting components in the array of image collecting components can be turned on according to the window being viewed by the user, and thus the image corresponding to the first window and the touch input corresponding to the window can be collected by the array of image collecting components.

Figure 12:
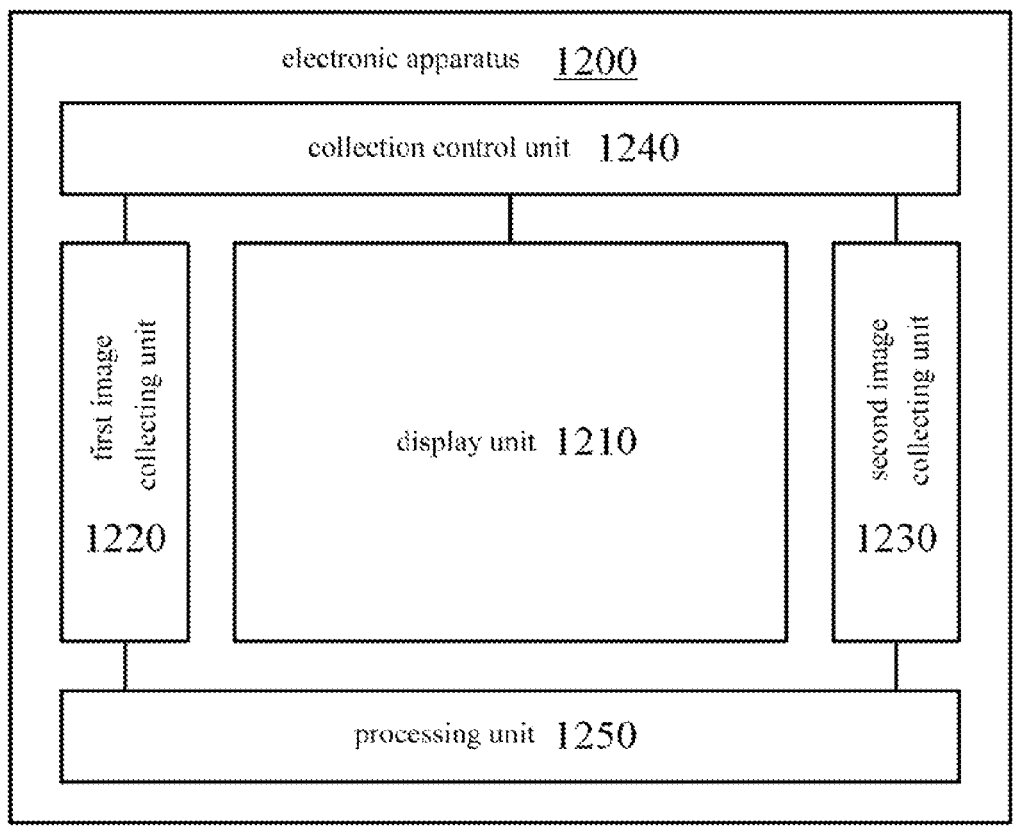
FIG. 12 is an exemplary structural block diagram showing an electronic apparatus according to one embodiment of the present invention.

Hereinafter, an electronic apparatus of one embodiment of the present invention is illustrated with reference to FIG. 12. FIG. 12 is an exemplary structural block diagram showing an electronic apparatus 1200 according to one embodiment of the present invention. As shown in FIG. 12, the electronic apparatus of this embodiment may include a display unit 1210, a first image collecting unit 1220, a second image collecting unit 1230, a collection control unit 1240, and a processing unit 1250. The respective units of the electronic apparatus 1200 perform the various steps/functions of the display method in the above FIG. 8, and thus for the sake of conciseness, no more details are described.

For example, the display unit 1210 may display a first window and a second window. According to one example of the present invention, the first window may correspond to a first application installed on an electronic apparatus, while the second window may correspond to the second application installed on the electronic apparatus. According to another example of the present invention, before the display unit 1210 displays the first window and the second window, the processing unit 1250 may set that the display region of the first window does not overlap with the display region of the second window.

In addition, according to another example of the present invention, the display unit 1210 of the electronic apparatus may include one display screen on which a first window and a second window are displayed. Alternatively, the display unit 1210 may also include a first display screen and a second display screen provided on two different surfaces thereof, and the first window may be displayed on the first display screen, and the second window may be displayed on the second display screen.

The collection control unit 1240 may turn on the first image collecting unit 1220 and the second image collecting unit 1230 according to first window and second window displayed by the display unit 1210, wherein the first image collecting unit 1220 corresponds to the first window, and the second image collecting unit 1230 corresponds to the second window. During the turning on, the first image collecting unit 1220 may obtain the first image and the second image collecting unit 1230 may obtain the second image.

According to one example of the present invention, the display unit 1210 may include one display screen, the first image collecting unit 1220 and the second image collecting unit 1230 may be cameras located on the left and right sides of the display screen. The correspondence of the first window and the second window with the first image collecting unit 1220 and the second image collecting unit 1230 may be determined according to the display positions of the first window and the second window on the screen. For example, when the first window is displayed in the left side of the display screen and the second window is displayed in the right side of the display screen, the first window may correspond to the camera set in the left side of the display screen, and the second window may correspond to the camera set in the right side of the display screen, and vise visa. Alternatively, according to another example of the present invention, in the case that the display unit 1210 comprises a first display screen and a second display screen provided on two different surfaces thereof, the first image collecting unit 1220 may be set on the first surface on which the first display screen is located, while the second image collecting unit 1230 may be set on the second surface on which the second display screen is located. Thus, the first image collecting unit may correspond to the first window displayed on the first display screen, and the second image collecting unit may correspond to the second window displayed on the second display screen.

The processing unit 1250 may provide the first image to a first application to which the first window corresponds, and provide the second image to a second application to which the second window corresponds according to the correspondence between the image collecting units and the windows. According to one example of the present invention, the first application and the second application may be instant communication applications capable of performing video transmission, or other applications supporting an image collection function or capable of processing the collected image.

In addition, according to another example of the present invention, the first application and the second application may be different applications. For example, the first application and the second application may be two different instant communication applications. Alternatively, the first application and the second application may be the same application, but the first window and the second window may correspond to the different processes of the same application.

Via the electronic apparatus provided by this embodiment, images collected by a plurality of image collecting units can be provided to applications to which a plurality of windows in one electronic apparatus correspond, so that the multiple window processes can independently perform an operation such as a video call or the like, which brings convenience to use of the users.

Figure 13:
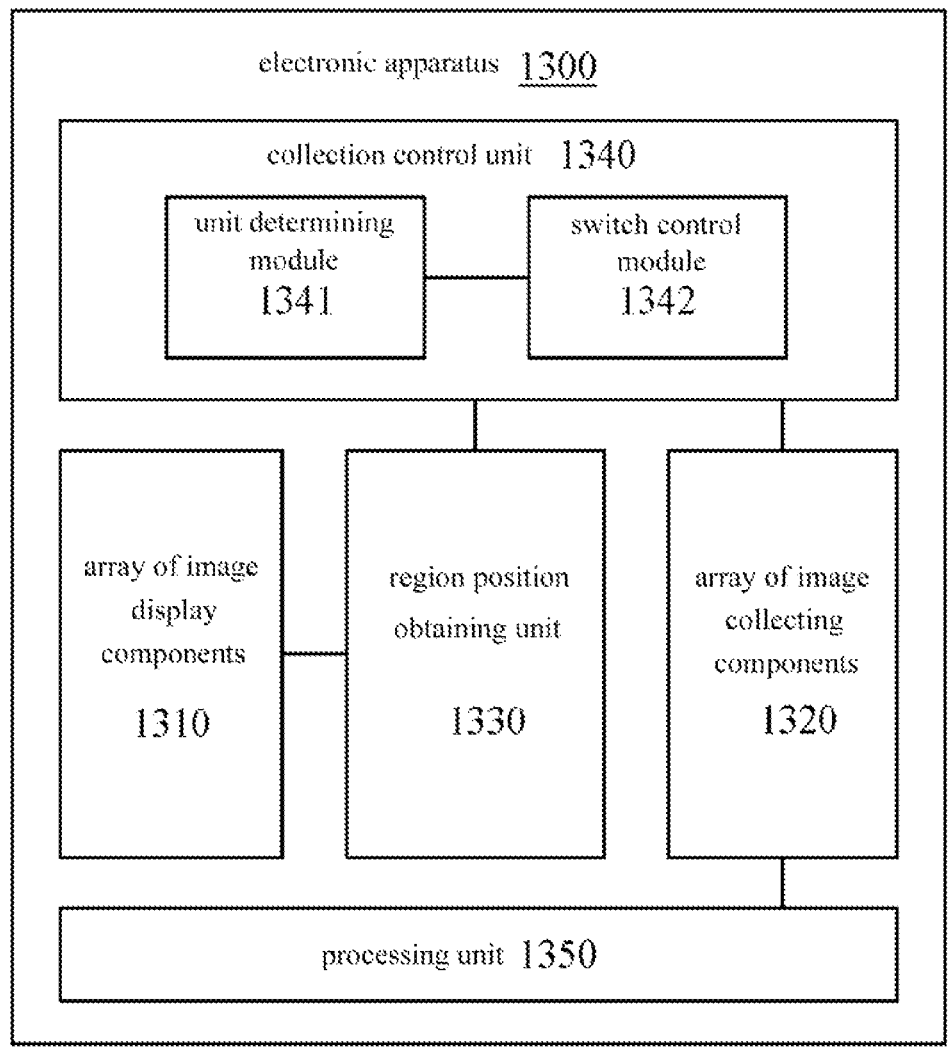
FIG. 13 is an exemplary structural block diagram showing an electronic apparatus according to another embodiment of the present invention.

As described in the above embodiments, the display unit may be a camera. However, the present invention is not limited thereto. FIG. 13 is an exemplary structural block diagram showing an electronic apparatus 1300 according to another embodiment of the present invention. The electronic apparatus 1300 shown in FIG. 13 is one example of the electronic apparatus 1200 described in FIG. 12. Hereinafter, the electronic apparatus of another embodiment of the present invention is illustrated with reference to FIG. 13.

As shown in FIG. 13, the electronic apparatus of this embodiment may include an array of image display components 1310, an array of image collecting components 1320, a region position obtaining unit 1330, a collection control unit 1340, and a processing unit 1350. The respective units of the electronic apparatus 1300 perform the various steps/functions of the display method in the above FIG. 9, and thus for the sake of conciseness, no more details are described.

For example, the array of image display components 1310 is one example of the display unit 1210 in the electronic apparatus 1200 shown in FIG. 12. The array of image display components 1310 may display a first window and a second window. The array of the image collecting components 1320 may be set in correspondence with the array of image display components 1310 along a direction perpendicular to the screen of the electronic apparatus. According to one example of the present invention, the array of image display components and the array of image collecting components may be set in the same plane in a direction perpendicular to the screen of the electronic apparatus. For example, the image display components and the image collecting components may be set alternately every other row and/or every other column within a transparent housing of the display screen. In this way, the image collecting components can collect the image of the user who is viewing the displayed contents while the image display components are displaying images.

Alternatively, according to another example of the present invention, the array of image display components and the array of image collecting components may be set in different planes in a direction perpendicular to the screen of the electronic apparatus. For example, the array of image display components may be set near the screen housing of the electronic apparatus, and the array of image collecting components may be set behind the plane where the array of image display components is set and along a direction perpendicular to the screen of the electronic apparatus. In this situation, the image display components in the array of image display components can be switched between a turned-on state and a turned-off state with a predetermined frequency. When the image display components are turned off, the image collecting components in the array of image collecting components can be turned on so as to facilitate the image collection through the transparent housing of the screen.

The first image collecting unit 1220 shown in FIG. 12 may be constituted by a part of the image collecting components in the array of image collecting components 1320, and the second image collecting unit 1230 may be constituted by a part of the image collecting components in the array of image collecting components 1320, and details will be described later.

The region position obtaining unit 1330 may obtain the position of a first region in the first window and the position of a second region in the second window. The collection control unit 1340 includes a unit determining module 1341 and a switch control module 1342. The unit determining module 1341 may determine the image collecting components corresponding to the first region in the first window in the array of image collecting components as a first image collecting unit according to the position of the first region, and determine the image collecting components corresponding to the second region in the second window in the array of image collecting components as a second image collecting unit according to the position of the second region. The switch control module 1342 may turn on the determined first image collecting unit and second image collecting unit.

As described above, the first region may be less than or equal to the display region of the first window. Accordingly, the number of the image collecting components corresponding to the first region is less than or equal to the number of the image collecting components in the array of image collecting components. Similarly, the number of the image collecting components corresponding to the second region is less than or equal to the number of the image collecting components in the array of image collecting components.

According to one example of the present invention, when the array of image display components and the array of image collecting components are set in the same plane in a direction perpendicular to the screen of the electronic apparatus, the image collecting components corresponding to the first region may include the components within the display region of the first window, and the image collecting components corresponding to the second region may include the components within the display region of the second window; whereas when the array of image display components and the array of image collecting components are set in different planes in a direction perpendicular to the screen of the electronic apparatus, the image collecting components corresponding to the first region may include the image collecting components within a range corresponding to the display region of the first window in the array of image collecting components, and the image collecting components corresponding to the second region may include the image collecting components within a range corresponding to the display region of the second window in the array of image collecting components.

The processing unit 1350 may provide the first image to a first application to which the first window corresponds, and provide the second image to a second application to which the second window corresponds according to the correspondence between the image collecting units and the windows. For example, in this embodiment, the first image collecting unit corresponds to the first window, thus the first image is provided to the first application to which the first window corresponds; and the second image collecting unit corresponds to the second window, thus the second image is provided to a second application to which the second window corresponds. According to one example of the present invention, the first application and the second application may be instant communication applications capable of performing video transmission, or other applications supporting an image collection function or capable of processing the collected image.

Via the electronic apparatus provided by this embodiment, not only that images collected by a plurality of image collecting units can be provided to applications to which a plurality of windows in one electronic apparatus correspond so that the multiple window processes can independently perform an operation such as a video call or the like, but also there is no need to turn on all the components in the array of image collecting components when turning on the apparatus, instead, only the corresponding image collecting components in the array of image collecting components are to be turned on according to the window being viewed by the user, thereby reducing the power consumed by the array of image collecting components and effectively decreasing the transmitted data amount while maintaining the image resolution.

According to one example of the present invention, the electronic apparatus shown in FIG. 13 may further include a free region determining unit, which may determine a free region that displays no window in the array of image collecting components, and turn off the image collecting components corresponding to the free region in the array of image collecting components. For example, the free region determining unit may determine the free region that displays no window in the array of image collecting components with a predetermined time interval. Further, when the first window and/or the second window is closed, the collection control unit may turn off the image collecting components corresponding to the first region in the first window and/or the image collecting components corresponding to the second region in the second window. Thereby the power consumption of the image collecting components and the burden on image processing of the electronic apparatus can be further saved.

Furthermore, on the other hand, the user is not always in a stationary state when viewing the window and he/she may move his/her own position, and in order to facilitate the viewing, the user may operate the window to move the display position of the window. In this situation, it may cause the collecting components turned on according to the position of the first region when the first window is initially displayed unable to collect the image desired by the user. Therefore, according to another example of the present invention, in the electronic apparatus shown in FIG. 13, it is also possible for the processing unit to move the first window according to a first window move instruction. The region position obtaining unit may obtain the position of the first region in the moved first window in real time. The unit determining module may re-determine the image collecting components corresponding to the first region in the moved first window in the array of image collecting components as the first image collecting unit according to the position of the first region in the moved first window. The switch control module may turn on the re-determined first image collecting unit.

Furthermore, as described above, the switch control module may turn off the image collecting components corresponding to the free region in the array of image collecting components while turning on the corresponding image collecting components in the array of image collecting components according to the moved position of the first window.

It should be noted that in the embodiments of the present invention, the terms "first window" and "second window" are used to only distinguish between different windows, rather than indicating a specific one. That is to say, the objects denoted by the first window and the second window may be interchangable, and solutions obtained after the interchanging are also within scope of embodiments of the present invention. The electronic apparatus may move the second window according to a second window move instruction, and re-determine the image collecting components corresponding to the second region in the moved second window in the array of image collecting components as the second image collecting unit according to the position of the second region in the moved second window.

In addition, according to another example of the present invention, when the display region of the moved first window at least partially overlaps with the display region of the second window, in the electronic apparatus shown in FIG. 13, the processing unit may merge the first window and the second window into a third window. The region position obtaining position may obtain the position of a third region in the third window. The unit determining unit may determine the image collecting components corresponding to the third region in the third window in the array of image collecting components as a third image collecting unit according to the position of the third region. The switch control module may turn on the determined third image collecting unit to obtain a third image by the third image collecting unit. The image providing module may provide the third image respectively to the first application and the second application. According to one example of the present invention, when turning on the determined third image collecting unit, the switch control unit may turn off the image collecting components that correspond to the first region or the second region before the merging but do not correspond to the third region.

Via the electronic apparatus provided by this embodiment, images collected by a plurality of image collecting units can be provided to a plurality of applications to which one window in one electronic apparatus corresponds, so that operations such as a video call or the like can be performed via the plurality of applications.

According to another example of the present invention, the electronic apparatus may also comprise a touch sensing unit set to overlap with the screen to detect touch operations performed by an operating body. In addition, according to another example of the present invention, touch operations performed by an operating body on the display screen may also be detected by the image collecting components.

The method of controlling image collection and the corresponding electronic apparatus in the above embodiments of the present invention as shown in FIGS. 8 to 13 may be used not only independently, but also in combination with the control method, the control device, and the electronic apparatus as shown in FIGS. 1 to 7

For example, the above method of controlling image collection as shown in FIGS. 8 and 9 may be further applied to the control method shown in FIG. 1.

Herein, preferably, the control method according to a preferable embodiment of the present invention is applied to an electronic apparatus comprising: an array of image display components and an array of image collecting components set in correspondence with each other along a direction perpendicular to the screen of the electronic apparatus. Further, the method comprises: displaying a first window by the array of image display components; displaying a second window by the array of image display components; obtaining the position of a first region in the first window; obtaining the position of a third region in the second window; turning on the image collecting components corresponding to the first region in the first window in the array of image collecting components according to the position of the first region, wherein the number of the image collecting components corresponding to the first region is less than or equal to the number of the image collecting components in the array of image collecting components; turning on the image collecting components corresponding to the third region in the second window in the array of image collecting components according to the position of the third region, wherein the number of the image collecting components corresponding to the third region is less than or equal to the number of the image collecting components in the array of image collecting components; obtaining a first image by the image collecting components corresponding to the first region; obtaining a second image by the image collecting components corresponding to the third region; and providing the first image to a first application to which the first window corresponds, and providing the second image to a second application to which the second window corresponds according to the correspondence between the image collecting components and the windows.

Similarly, for example, the above electronic apparatus shown in FIGS. 12 and 13 may be further applied to the electronic apparatus shown in FIG. 4.

Herein, preferably, the electronic apparatus according to a preferable embodiment of the present invention comprises: an array of image display components configured to display a first window and also configured to display a second window; a region position obtaining unit configured to obtain the position of a first region in the first window and also configured to obtain the position of a third region in the second window; an array of image collecting components set in correspondence with the array of image display components along a direction perpendicular to the screen of the electronic apparatus; and a collection control unit configured to turn on the image collecting components corresponding to the first region in the first window in the array of image collecting components according to the position of the first region, wherein the number of the image collecting components corresponding to the first region is less than or equal to the number of the image collecting components in the array of image collecting components, and also configured to turn on the image collecting components corresponding to the third region in the second window in the array of image collecting components according to the position of the third region, wherein the number of the image collecting components corresponding to the third region is less than or equal to the number of the image collecting components in the array of image collecting components; the array of image collecting components is configured to obtain a first image by the image collecting components corresponding to the first region and also configured to obtain a second image by the image collecting components corresponding to the third region. The electronic apparatus further comprises: a processing unit, which includes an image providing module configured to provide the first image to a first application to which the first window corresponds and provide the second image to a second application to which the second window corresponds according to the correspondence between the image collecting components and the windows.

In this way, via the solutions provided by the preferable embodiment of the present invention, there is no need to turn on all the components in the array of image collecting components when turning on the apparatus, instead, only the corresponding image collecting components in the array of image collecting components are to be turned on according to the window being viewed by the user, meanwhile images collected by a plurality of image collecting components can be provided to different applications, thereby reducing the power consumed by the array of image collecting components and effectively decreasing the transmitted data amount while maintaining the image resolution, and multiple users can independently and simultaneously perform an operation such as a video call or the like by one electronic apparatus, which brings convenience to use of the users.

Next, a method of processing the collected image and an electronic equipment according to an embodiment of the present invention will be described in detail with reference to FIGS. 14 to 20.

In the following embodiments of the present invention, an electronic apparatus refers to an apparatus capable of communicating with other apparatus. The specific form of the electronic apparatus includes but is not limited to mobile telephones, personal digital assistants, portable computers, tablet computers, game consoles, music players etc.

Figure 14:
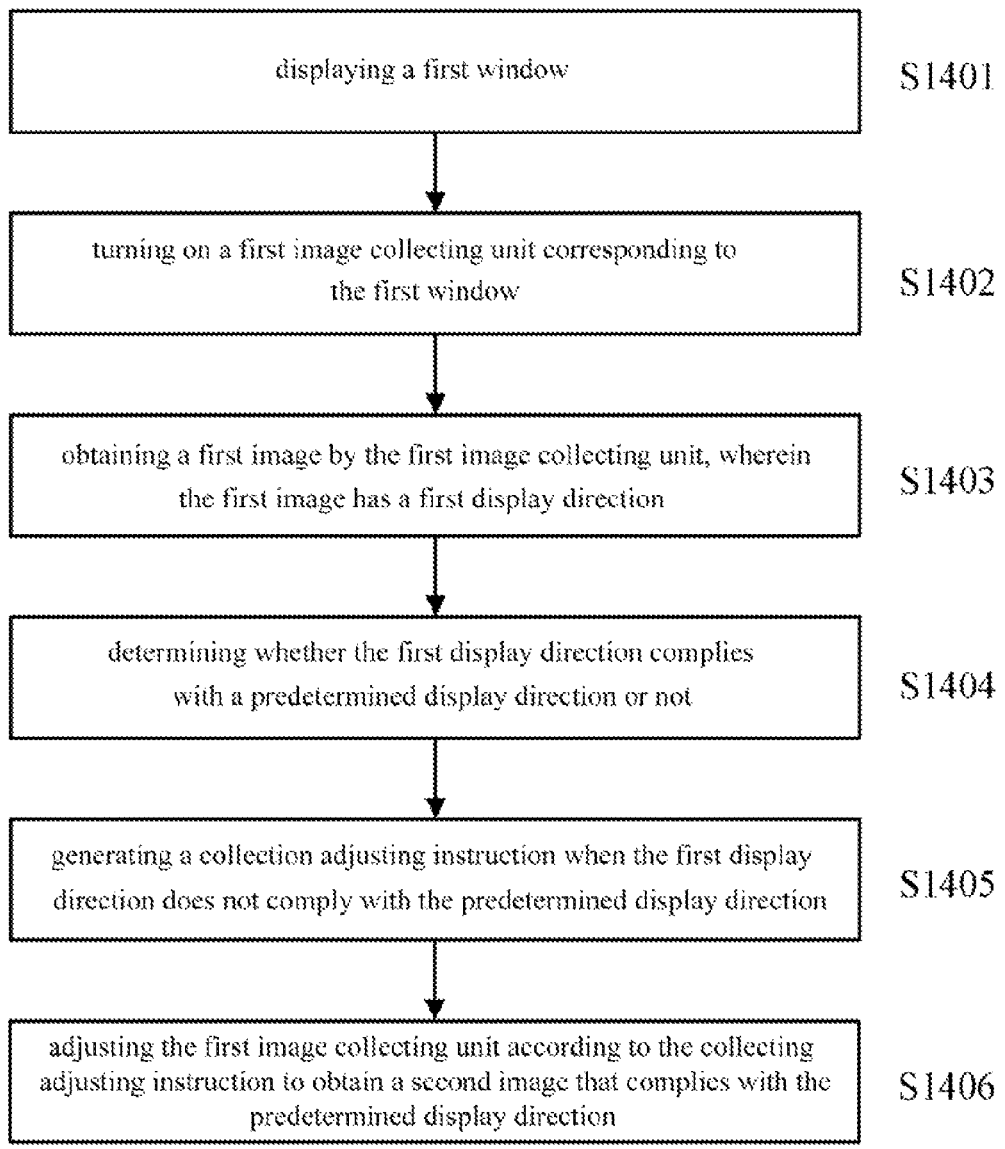
FIG. 14 is a flowchart depicting a method of processing the collected image according to one embodiment of the present invention.

FIG. 14 is a flowchart depicting a method 1400 of processing the collected image according to one embodiment of the present invention, that is, the explanatory diagram of one exemplary case that a input image is displayed on a display apparatus. Hereinafter, a method of processing the collected image according to an embodiment of the present invention will be described with reference to FIG. 14. The method 1400 of processing the collected image may be used to the above electronic apparatus. Further, in this embodiment, the method 1400 of processing the collected image may be used to an electronic apparatus that includes an image display unit and an image collecting unit.

As shown in FIG. 14, in step S1401, a first window is displayed. According to one example of the present invention, the first window may correspond to a first application installed on an electronic apparatus. Then in step S1402, a first image collecting unit corresponding to the first window is turned on. According to one example of the present invention, the electronic apparatus may include one display screen and multiple cameras located around the display screen. It may be determined which cameras in the image collecting unit the first window corresponds to according to the display position of the first window on the screen.

In step S1403, a first image is obtained by the first image collecting unit, wherein the first image has a first display direction. And in step S1404, it is determined whether the first display direction complies with a predetermined display direction or not. According to one example of the present invention, in step S1404, the collected object in the first image may be recognized, and it may be determined whether the first display direction of the collected object complies with a predetermined display direction or not. In addition, according to another example of the present invention, the predetermined display direction may be the display direction of the first window.

Figure 15A:
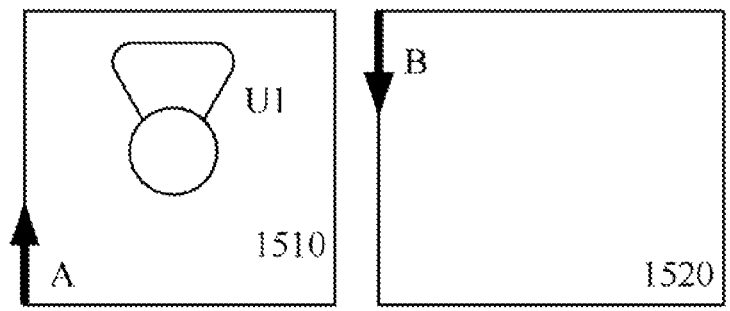
FIGS. 15A and 15B are schematic diagrams showing the first image collected by the first image collecting unit according to an example in this aspect.
Figure 15B:
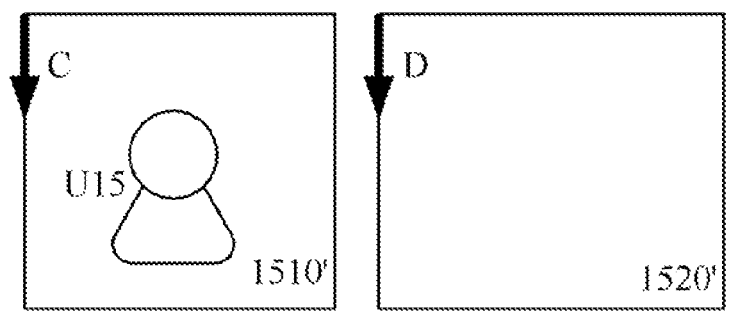

FIGS. 15A and 15B are schematic diagrams showing the first image collected by the first image collecting unit according to an example in this aspect. As shown in FIG. 15A, the collected object in the first image 1510 is a user U1, and the user U1 has a first display direction as shown by an arrow A. The first window 1520 has a display direction as shown by an arrow B. In the example shown in FIG. 15A, it may be determined that the first display direction does not comply with the predetermined display direction, i.e., the first display direction is different from the display direction of the first window 1520.

While as shown in FIG. 15B, the collected object in the first image 1510' is a user U2, and the user U2 has a first display direction as shown by an arrow C. The first window 1520' has a display as shown by an arrow D. In the example as shown in FIG. 15B, it may be determined that the first display direction complies with the predetermined display direction, i.e., the first display direction is the same as the display direction of the first window 1520.

In addition, according to another example of the present invention, the method shown in FIG. 14 may further comprise receiving a window rotating operation, wherein the window rotating operation may be used to display the display direction of the first window. In case that the predetermined display direction is the display direction of the first window, it may be determined whether the first display direction complies with the display direction of the rotated window or not according to the window rotating operation. For example, in the example shown in FIG. 15B, when receiving a window rotating operation of rotating the displayed first window to the left by 90 degrees, it may be determined that the first display direction does not comply with the predetermined display direction.

Then, in step S1405, when the first display direction does not comply with the predetermined display direction, a collection adjusting instruction is generated. According to one example of the present invention, when the first display direction does not comply with the predetermined display direction, the interval angle between the first display direction and the predetermined display direction may be determined, and a collection adjusting instruction can be generated according to the interval angle. For example, in the example shown in FIG. 15B, when receiving a window rotating operation of rotating the displayed first window to the left by 180 degrees, the interval angle between the first display direction and the predetermined display direction (i.e., the display direction of the first window) may be determined as 180 degrees.

Finally, in step S1406, the first image collecting unit is adjusted according to the collection adjusting instruction to obtain a second image, wherein the second image has a second display direction that complies with the predetermined display direction. According to one example of this aspect, the electronic apparatus may comprise a collecting unit rotating section connected to the image collection unit. In step S1406, in response to the collection adjusting instruction, the first image collecting unit may be rotated according to the interval angle to obtain a second image by the rotated first image collecting unit. For example, in the example shown in FIG. 15B, when receiving a window rotating operation of rotating the displayed first window by 180 degrees, a collection adjusting instruction indicating that the interval angle between the first display direction and the predetermined display direction (i.e., the display direction of the first window) is 180 degrees may be generated. And then in response to the collection adjusting instruction, the first image collecting unit may be rotated by 180 degrees by the collecting unit rotating section, to obtain a second image by the rotated first image collecting unit.

Alternatively, according to another example of the present invention, the electronic apparatus may comprise an image rotating section connected to the image collecting unit. In step S1406, in response to the collection adjusting instruction, the first image collecting unit rotates the first image according to the interval angle to obtain a second image. For example, in the example shown in FIG. 15B, when receiving a window rotating operation of rotating the displayed first window by 180 degrees, a collection adjusting instruction indicating that the interval angle between the first display direction and the predetermined display direction (i.e., the display direction of the first window) is 180 degrees may be generated. And then in response to the collection adjusting instruction, the first image 1510 is rotated by 180 degrees by the collecting unit.

Via the method of processing the collected image provided by this embodiment, the image collecting unit can be adjusted by determining whether the direction of the image collected by it complies with a predetermined display direction or not, so as to provide the image having a display direction that complies with the predetermined display direction to the corresponding application. Accordingly, the user does not need to adjust his/her own position to cater to the collecting direction of the image collecting unit.

In addition, according to one example in this aspect, the method shown in FIG. 14 may further comprise providing a first image or a second image that complies with a predetermined display direction to a first application to which the first window corresponds. According to one example of the present invention, the first application may be instant communication applications capable of performing video transmission, or other applications supporting an image collection function or capable of processing the collected image.

Figure 16:
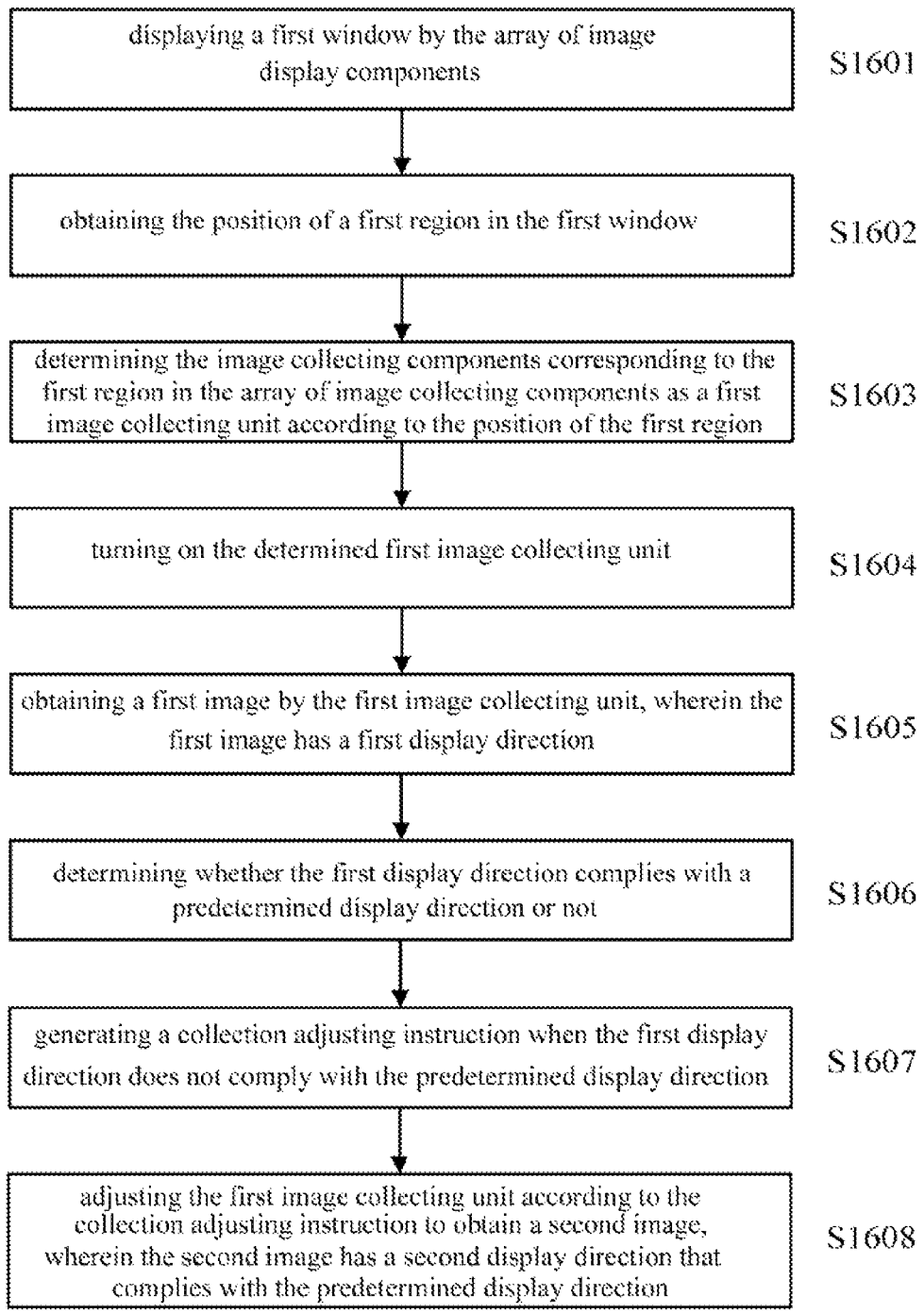
FIG. 16 is a flowchart depicting a method of processing the collected image according to another embodiment of the present invention.

As described in the above embodiments, the display unit may be a camera. However, the present invention is not limited thereto. FIG. 16 is a flowchart depicting a method 1600 of processing the collected image according to another embodiment of the present invention. The method 1600 shown in FIG. 16 is one example of the method 1400 shown in FIG. 14. The method 1600 of processing the collected image may be applied to an electronic apparatus comprising an array of image display components and an array of image collecting components set in correspondence with each other along a direction perpendicular to the screen of the electronic apparatus.

According to one example of the present invention, the array of image display components and the array of image collecting components may be set in the same plane in a direction perpendicular to the screen of the electronic apparatus. For example, the image display components and the image collecting components may be set alternately every other row and/or every other column within a transparent housing of the display screen. In this way, the image collecting components can collect the image of the user who is viewing the displayed contents while the image display components are displaying images.

Alternatively, according to another example of the present invention, the array of image display components and the array of image collecting components may be set in different planes in a direction perpendicular to the screen of the electronic apparatus. For example, the array of image display components may be set near the screen housing of the electronic apparatus, and the array of image collecting components may be set behind the plane where the array of image display components is set and along a direction perpendicular to the screen of the electronic apparatus. In this situation, the image display components in the array of image display components can be switched between a turned-on state and a turned-off state with a predetermined frequency. When the image display components are turned off, the image collecting components in the array of image collecting components can be turned on so as to facilitate the image collection through the transparent housing of the screen.

As shown in FIG. 16, in step S1601, a first window is displayed by the array of image display components. In step S1602, the position of a first region in the first window is obtained. The first region may be less than or equal to the display region of the first window. For example, the first window may include an image display region and a function selection region, and the first region may be the image display region in the first window.

In step S1603, the image collecting components corresponding to the first region in the array of image collecting components are determined as a first image collecting unit according to the position of the first region. Then, in step S1604 the determined first image collecting unit is turned on.

As described above, the first region may be less than or equal to the display region of the first window. Accordingly, the number of the image collecting components corresponding to the first region is less than or equal to the number of the image collecting components in the array of image collecting components.

According to one example of the present invention, when the array of image display components and the array of image collecting components are set in the same plane in a direction perpendicular to the screen of the electronic apparatus, the image collecting components corresponding to the first region may include the components within the display region of the first window, and the image collecting components corresponding to the second region may include the components within the display region of the second window; whereas when the array of image display components and the array of image collecting components are set in different planes in a direction perpendicular to the screen of the electronic apparatus, the image collecting components corresponding to the first region may include the image collecting components within a range corresponding to the display region of the first window in the array of image collecting components, and the image collecting components corresponding to the second region may include the image collecting components within a range corresponding to the display region of the second window in the array of image collecting components.

Then, in step S1605, a first image is obtained by the first image collecting unit, wherein the first image has a first display direction. And in step S1606, it is determined whether the first display direction complies with a predetermined display direction or not. According to one example of the present invention, in step S1606, the collected object in the first image may be recognized, and it may be determined whether the first display direction of the collected object complies with a predetermined display direction or not. In addition, according to another example of the present invention, the predetermined display direction may be the display direction of the first window.

When the first display direction does not comply with the predetermined display direction, in step S1607, a collection adjusting instruction is generated. Finally, in step S1608, the first image collecting unit is adjusted according to the collection adjusting instruction to obtain a second image, wherein the second image has a second display direction that complies with the predetermined display direction.

Via the method according to this embodiment, when the display screen of the electronic apparatus comprising an array of image display components and an array of image collecting components set in correspondence with each other along a direction perpendicular to the screen of the electronic apparatus is placed horizontally, no matter which side of the display screen the user is at, a collected image that complies with a predetermined display direction can always be obtained.

According to one example of the present invention, a first image or a second image that complies with a predetermined display direction may be displayed in the first region. Alternatively, the contents displayed in the first region may be independent of the images collected by the first image collecting unit. For example, when the first application to which the first window corresponds is an instant communication application, it is possible to display the image of the counter party in communication with the user using the current electronic apparatus in the first region. Since the user is viewing the image of the counter party in communication in the first region during a video call, it is possible to collect the front view image of the user by the image collecting components corresponding to the first region so as to transmit the same to the counter party in communication. In addition, when the first application to which the first window corresponds is an instant communication application, in addition to the first region, the first window may further include a local image viewing region to display the first image or the second image that complies with a predetermined display direction.

When the contents displayed in the first region may be independent of the images collected by the first image collecting unit, in the case of receiving a window rotating operation, the direction of the displayed contents in the first region may be rotated according to the window rotating operation, meanwhile a collection adjusting instruction may be generated according to the rotating angle of the window to adjust the first image collecting unit.

For example, in the example shown in FIG. 15B, when receiving a window rotating operation of rotating the displayed first window to the left by 90 degrees, the displayed first window 1520' is rotated to the left by 90 degrees, and a collection adjusting instruction may be generated to rotate the first image collecting unit to the left by 90 degrees, or thereafter the first image collection 1510' collected by the first image collecting unit is rotated to the right by 90 degrees.

In addition, according to another example of the present invention, the method shown in FIG. 16 may further comprise determining a free region that displays no window in the array of image collecting components, and turning off the image collecting components corresponding to the free region in the array of image collecting components. For example, the free region that displays no window in the array of image collecting components may be determined with a predetermined time interval. Further, when the first window is closed, the image collecting components corresponding to the first region in the first window may be turned off. Thereby the power consumption of the image collecting components and the burden on image processing of the electronic apparatus can be saved.

Figure 17:
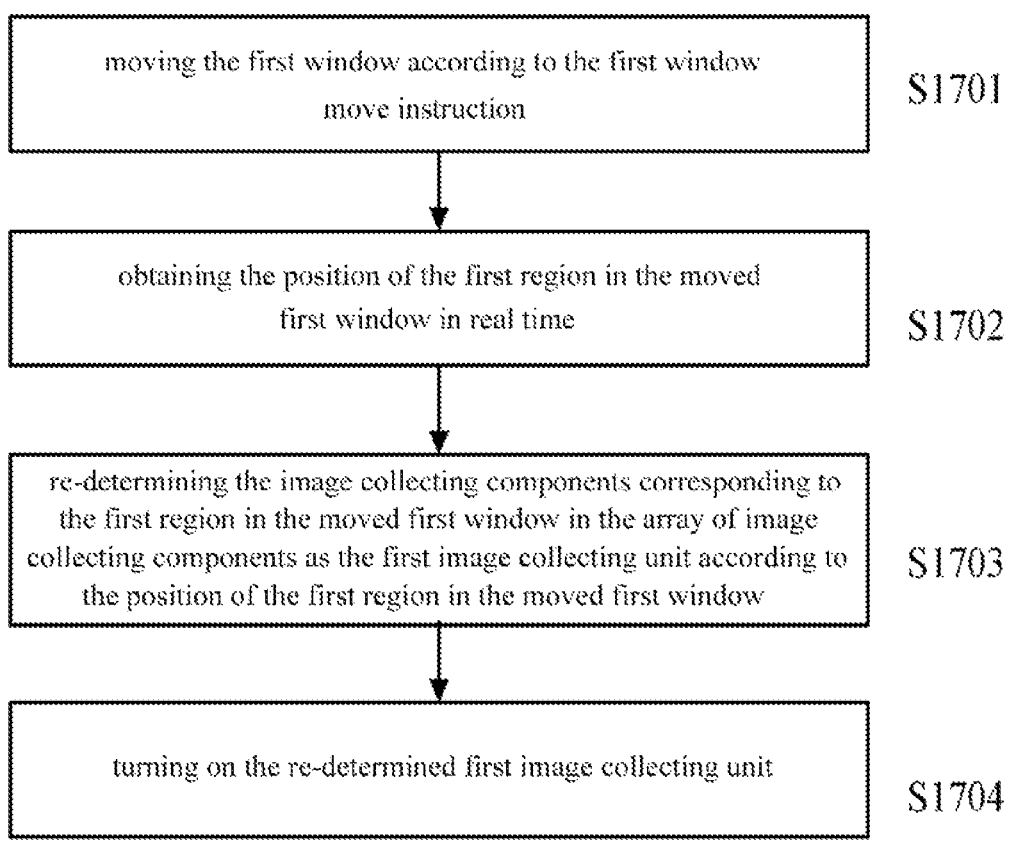
FIG. 17 is a flowchart depicting a method of controlling turning on of the related image collecting components in an array of image collecting components with the movement of the first window, after the method of controlling the image collection shown in FIG. 16, according to one embodiment of the present invention.

Furthermore, on the other hand, the user is not always in a stationary state when viewing the window and he/she may move his/her own position, and in order to facilitate the viewing, the user may operate the window to move the display position of the window. In this situation, it may cause the collecting components turned on according to the position of the first region when the first window is initially displayed unable to collect the image desired by the user. Therefore, according to another example of the present invention, after the method 1600 described in FIG. 16, it is also possible to move the first window according to a first window move instruction, and turn on the related image collecting components in the array of image collecting components according to the moved first window. FIG. 17 is a flowchart depicting a method 1700 of controlling turning on of the related image collecting components in an array of image collecting components with the movement of the first window, after the method 1600 of controlling the image collection shown in FIG. 16, according to one embodiment of the present invention;

As shown in FIG. 17, in step S1701, the first window is moved according to the first window move instruction. According to one example of the present invention, a first window move instruction may be received from a user before moving the first window according to the first window move instruction.

Alternatively, according to another example of the present invention, prior to moving the first window according to the first window move instruction, the following steps may be also comprised: recognizing a collected object in the first image after obtaining the first image; determining the position of the collected object in the first image; and generating a first window move instruction when the position of the collected object in the first image exceeds a predetermined range. For example, the collected object may be a user viewing the first window, and it may be determined in advance that in the collected first image, the user should be at an intermediate region of the first image. The position of the user viewing the first window in the first image may be determined by image recognition, and the first window move instruction may be generated when the position of the user in the first image exceeds a predetermined intermediate region of the first image. More specifically, the moving direction of the first window may be determined according to the position of the user in the first image, and thereby generating a corresponding first window move instruction.

In step S1702, the position of the first region in the moved first window is obtained in real time. Then, in step S1703, the image collecting components corresponding to the first region in the moved first window in the array of image collecting components are re-determined as the first image collecting unit according to the position of the first region in the moved first window. Then in the step S1704, the re-determined first image collecting unit is turned on.

Via the method provided by this embodiment, when the position of the first window being viewed by the user moves, the corresponding image collecting components in the array of image collecting components can be turned on according to the moved position of the first window.

In addition, according to another example of the present invention, touch operations performed by an operating body on the display screen may also be detected by the image collecting components. In particular, FIG. 18 is a flowchart showing a method 1800 of detecting touch operations of the user in the first window by the array of image collecting components.

Figure 18:
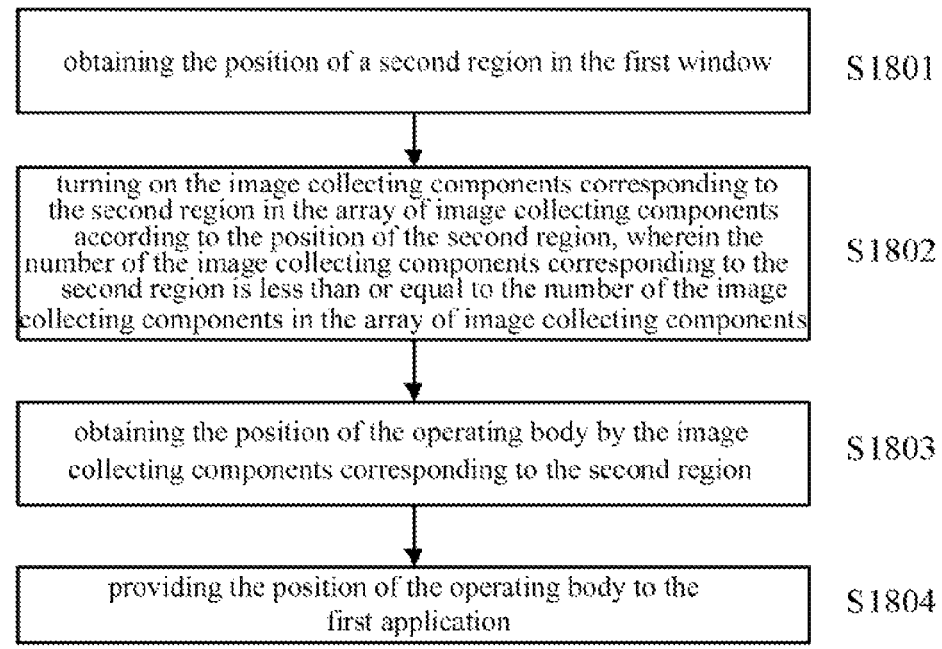
FIG. 18 is a flowchart showing a method of detecting touch operations of the user in the first window by the array of image collecting components.

As shown in FIG. 18, in step S1801, the position of a second region in the first window is obtained. According to one example of the present invention, the first window may include an image display region and a function selection region, and the first region may be the image display region in the first window, and the second region may be the function selection region in the first window.

In step S1802, the image collecting components corresponding to the second region in the array of image collecting components are turned on according to the position of the second region, wherein the number of the image collecting components corresponding to the second region is less than or equal to the number of the image collecting components in the array of image collecting components. According to one example of the present invention, the first region and the second region may be two different and non-overlapping regions in the first window. Alternatively, the first region and the second region may totally or partially overlap. In the case when the first region and the second region at least partially overlap, when an operating body such as the user's finger is operating in the overlapping region on the display screen, it is also possible to determine the position of the finger by recognizing the user's finger in the first image while obtaining the first image by the array of image collecting components.

In step S1803, the position of the operating body is obtained by the image collecting components corresponding to the second region. Finally, in step S1804, the position of the operating body is provided to the first application. Accordingly, the first application can determine a corresponding function option according to the position of the operating body and then perform the function.

Via the method provided by this embodiment, the corresponding image collecting components in the array of image collecting components can be turned on according to the window being viewed by the user, and thus the image corresponding to the first window and the touch input corresponding to the window can be collected by the array of image collecting components.

Figure 19:
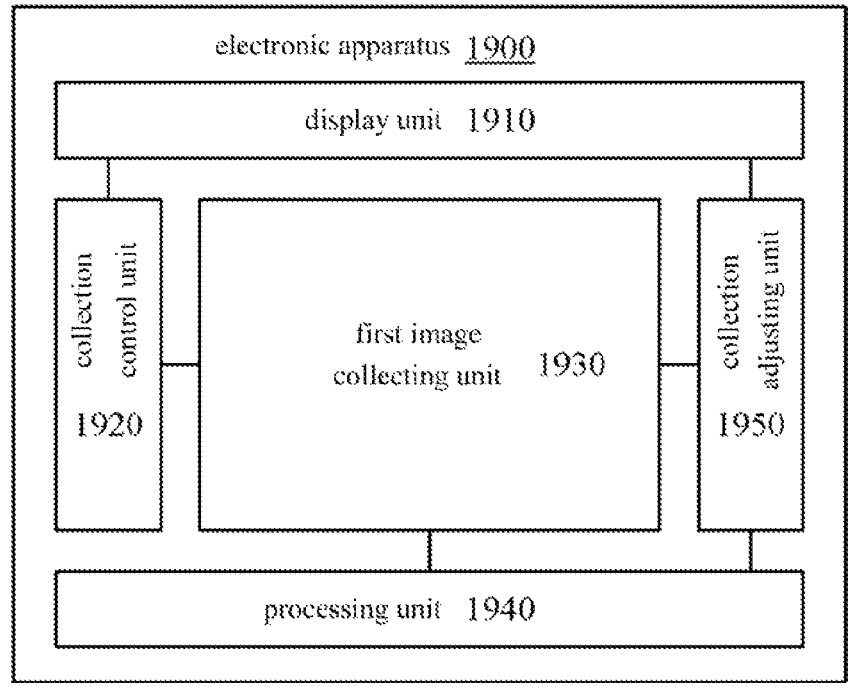
FIG. 19 is an exemplary structural block diagram showing an electronic apparatus according to one embodiment of the present invention.

Hereinafter, an electronic apparatus of one embodiment of the present invention is illustrated with reference to FIG. 19. FIG. 19 is an exemplary structural block diagram showing an electronic apparatus 1900 according to one embodiment of the present invention. As shown in FIG. 19, the electronic apparatus of this embodiment may include a display unit 1910, a collection control unit 1920, a first image collecting unit 1930, a processing unit 1940, and a collection adjusting unit 1950. The respective units of the electronic apparatus 1900 perform the various steps/functions of the display method in the above FIG. 14, and thus for the sake of conciseness, no more details are described.

For example, the display unit 1910 may display a first window. According to one example of the present invention, the first window may correspond to a first application installed on an electronic apparatus. The collection control unit 1920 may turn on the first image collecting unit 1930 corresponding to the first window. According to one example of the present invention, the electronic apparatus may include one display screen and multiple cameras located around the display screen. It may be determined which cameras in the image collecting unit the first window corresponds to according to the display position of the first window on the screen.

A first image may be obtained by the first image collecting unit 1930, wherein the first image has a first display direction. The processing unit 1940 may determine whether the first display direction complies with a predetermined display direction or not, and generate a collection adjusting instruction when the first display direction does not comply with the predetermined display direction. According to one example of the present invention, the processing unit 1940 may recognize the collected object in the first image, and determine whether the first display direction of the collected object complies with a predetermined display direction or not. In addition, according to another example of the present invention, the predetermined display direction may be the display direction of the first window.

In addition, according to another example of the present invention, the electronic apparatus 1900 may also comprise a receiving unit to receive a window rotating operation. In case that the predetermined display direction is the display direction of the first window, the processing unit may determine whether the first display direction complies with the display direction of the rotated window or not according to the window rotating operation.

In addition, according to another example of the present invention, when the first display direction does not comply with the predetermined display direction, the processing unit may determine the interval angle between the first display direction and the predetermined display direction, and generate a collection adjusting instruction according to the interval angle.

The collection adjusting unit 1950 may adjust the first image collecting unit according to the collection adjusting instruction to obtain a second image, wherein the second image has a second display direction that complies with the predetermined display direction. According to one example in this aspect, the collection adjusting unit 1950 may rotate the first image collecting unit according to the interval angle in response to the collection adjusting instruction, to obtain a second image by the rotated first image collecting unit. Alternatively, according to another example of the present invention, the collection adjusting unit 1950 may, in response to the collection adjusting instruction, adjust the first image collecting unit to rotate the first image according to the interval angle to obtain a second image.

Via the electronic apparatus provided by the this embodiment, the image collecting unit can be adjusted by determining whether the direction of the image collected by it complies with a predetermined display direction or not, so as to provide the image having a display direction that complies with the predetermined display direction to the corresponding application. Accordingly, the user does not need to adjust his/her own position to cater to the collecting direction of the image collecting unit.

In addition, according to one example in this aspect, the processing unit in the electronic apparatus shown in FIG. 19 may further provide a first image or a second image that complies with a predetermined display direction to a first application to which the first window corresponds. According to one example of the present invention, the first application may be instant communication applications capable of performing video transmission, or other applications supporting an image collection function or capable of processing the collected image.

Figure 20:
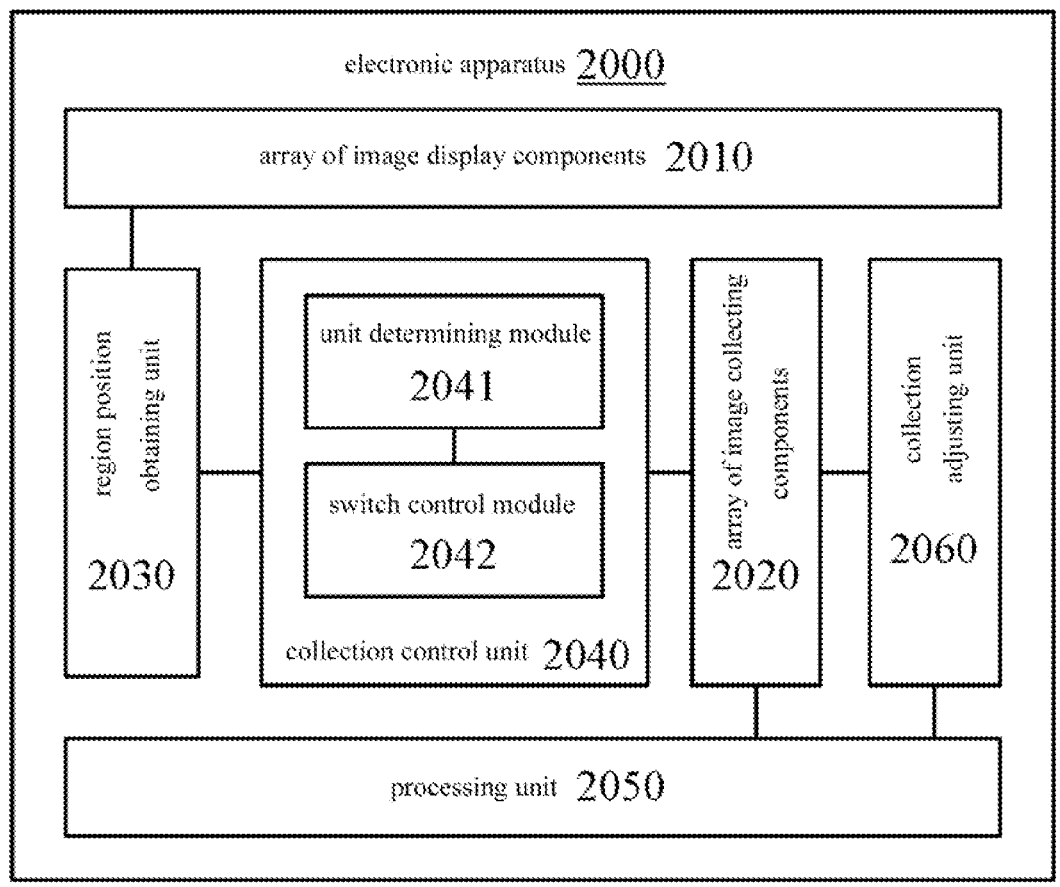
FIG. 20 is an exemplary structural block diagram showing an electronic apparatus according to another embodiment of the present invention.

As described in the above embodiments, the display unit may be a camera. However, the present invention is not limited thereto. FIG. 20 is an exemplary structural block diagram showing an electronic apparatus 2000 according to another embodiment of the present invention. The electronic apparatus 2000 shown in FIG. 20 is one example of the electronic apparatus 1900 shown in FIG. 19. Hereinafter, the electronic apparatus according to another embodiment of the present invention is illustrated with reference to FIG. 20.

As shown in FIG. 20, the electronic apparatus of this embodiment may include an array of image display components 2010, an array of image collecting components 2020, a region position obtaining unit 2030, a collection control unit 2040, a processing unit 2050, and a collection adjusting unit 2060. The respective units of the electronic apparatus 2000 perform the various steps/functions of the display method in the above FIG. 16, and thus for the sake of conciseness, no more details are described.

For example, the array of image display components 2010 may display a first window. The array of image collecting components 2020 may be set in correspondence with the array of image display components 2010 along a direction perpendicular to the screen of the electronic apparatus. According to one example of the present invention, the array of image display components and the array of image collecting components may be set in the same plane in a direction perpendicular to the screen of the electronic apparatus. For example, the image display components and the image collecting components may be set alternately every other row and/or every other column within a transparent housing of the display screen. In this way, the image collecting components can collect the image of the user who is viewing the displayed contents while the image display components are displaying images.

Alternatively, according to another example of the present invention, the array of image display components and the array of image collecting components may be set in different planes in a direction perpendicular to the screen of the electronic apparatus. For example, the array of image display components may be set near the screen housing of the electronic apparatus, and the array of image collecting components may be set behind the plane where the array of image display components is set and along a direction perpendicular to the screen of the electronic apparatus. In this situation, the image display components in the array of image display components can be switched between a turned-on state and a turned-off state with a predetermined frequency. When the image display components are turned off, the image collecting components in the array of image collecting components can be turned on so as to facilitate the image collection through the transparent housing of the screen.

The first image collecting unit shown in FIG. 19 may be constituted by a part of the image collecting components in the array of image collecting components 2020, and details will be described later.

The region position obtaining unit 2030 may obtain the position of a first region in the first window. The first region may be less than or equal to the display region of the first window. For example, the first window may include an image display region and a function selection region, and the first region may be the image display region in the first window.

The collection control unit 2040 may include a unit determining module 2041 and a switch control module 2042. The unit determining module 2041 may determine the image collecting components corresponding to the first region in the array of image collecting components as a first image collecting unit according to the position of the first region. The switch control module 2042 may turn on the determined first image collecting unit.

As described above, the first region may be less than or equal to the display region of the first window. Accordingly, the number of the image collecting components corresponding to the first region is less than or equal to the number of the image collecting components in the array of image collecting components.

According to one example of the present invention, when the array of image display components and the array of image collecting components are set in the same plane in a direction perpendicular to the screen of the electronic apparatus, the image collecting components corresponding to the first region may include the components within the display region of the first window, and the image collecting components corresponding to the second region may include the components within the display region of the second window; whereas when the array of image display components and the array of image collecting components are set in different planes in a direction perpendicular to the screen of the electronic apparatus, the image collecting components corresponding to the first region may include the image collecting components within a range corresponding to the display region of the first window in the array of image collecting components, and the image collecting components corresponding to the second region may include the image collecting components within a range corresponding to the display region of the second window in the array of image collecting components.

A first image may be obtained by the first image collecting unit, wherein the first image has a first display direction. The processing unit 2050 may determine whether the first display direction complies with a predetermined display direction or not, and generate a collection adjusting instruction when the first display direction does not comply with the predetermined display direction. According to one example of the present invention, the processing unit 2050 may recognize the collected object in the first image, and determine whether the first display direction of the collected object complies with a predetermined display direction or not. In addition, according to another example of the present invention, the predetermined display direction may be the display direction of the first window.

In addition, according to another example of the present invention, the electronic apparatus 2000 may also comprise a receiving unit to receive a window rotating operation. In case that the predetermined display direction is the display direction of the first window, the processing unit may determine whether the first display direction complies with the display direction of the rotated window or not according to the window rotating operation.

In addition, according to another example of the present invention, when the first display direction does not comply with the predetermined display direction, the processing unit may determine the interval angle between the first display direction and the predetermined display direction, and generate a collection adjusting instruction according to the interval angle.

The collection adjusting unit 2060 may adjust the first image collecting unit according to the collection adjusting instruction to obtain a second image, wherein the second image has a second display direction that complies with the predetermined display direction. According to one example in this aspect, the collection adjusting unit 2060 may rotate the first image collecting unit according to the interval angle in response to the collection adjusting instruction, to obtain a second image by the rotated first image collecting unit. Alternatively, according to another example of the present invention, the collection adjusting unit 2060 may, in response to the collection adjusting instruction, adjust the first image collecting unit to rotate the first image according to the interval angle to obtain a second image.

Via the electronic apparatus according to this embodiment, when the display screen of the electronic apparatus comprising an array of image display components and an array of image collecting components set in correspondence with each other along a direction perpendicular to the screen of the electronic apparatus is placed horizontally, no matter which side of the display screen the user is at, a collected image that complies with a predetermined display direction can always be obtained.

According to one example of the present invention, the electronic apparatus shown in FIG. 20 may further include a free region determining unit, which may determine a free region that displays no window in the array of image collecting components, and turn off the image collecting components corresponding to the free region in the array of image collecting components. For example, the free region determining unit may determine the free region that displays no window in the array of image collecting components with a predetermined time interval. Further, when the first window and/or the second window is closed, the collection control unit may turn off the image collecting components corresponding to the first region in the first window and/or the image collecting components corresponding to the second region in the second window. Thereby the power consumption of the image collecting components and the burden on image processing of the electronic apparatus can be further saved.

Furthermore, on the other hand, the user is not always in a stationary state when viewing the window and he/she may move his/her own position, and in order to facilitate the viewing, the user may operate the window to move the display position of the window. In this situation, it may cause the collecting components turned on according to the position of the first region when the first window is initially displayed unable to collect the image desired by the user. Therefore, according to another example of the present invention, in the electronic apparatus shown in FIG. 20, it is also possible for the processing unit to move the first window according to a first window move instruction. The region position obtaining unit may obtain the position of the first region in the moved first window in real time. The unit determining module may re-determine the image collecting components corresponding to the first region in the moved first window in the array of image collecting components as the first image collecting unit according to the position of the first region in the moved first window. The switch control module may turn on the re-determined first image collecting unit.

Furthermore, as described above, the switch control module may turn off the image collecting components corresponding to the free region in the array of image collecting components while turning on the corresponding image collecting components in the array of image collecting components according to the moved position of the first window.

According to another example of the present invention, the electronic apparatus may also comprise a touch sensing unit set to overlap with the screen to detect touch operations performed by an operating body. In addition, according to another example of the present invention, touch operations performed by an operating body on the display screen may also be detected by the image collecting components.

The method of processing the collected image and the electronic apparatus in the above embodiments of the present invention as shown in FIGS. 14 to 20 may be used not only independently, but also in combination with the control method, the control device, and the electronic apparatus as shown in FIGS. 1 to 7 and/or the method of controlling image collection and the corresponding electronic apparatus as shown in FIGS. 8 to 13.

For example, the above method of processing the collected image as shown in FIG. 14 may be further applied to the control method shown in FIG. 1.

Herein, preferably, the control method according to a preferable embodiment of the present invention is applied to an electronic apparatus comprising: an array of image display components and an array of image collecting components set in correspondence with each other along a direction perpendicular to the screen of the electronic apparatus. Further, the method comprises: displaying a first window by the array of image display components; obtaining the position of a first region in the first window; turning on the image collecting components corresponding to the first region in the first window in the array of image collecting components according to the position of the first region, wherein the number of the image collecting components corresponding to the first region is less than or equal to the number of the image collecting components in the array of image collecting components; obtaining a first image by the image collecting components corresponding to the first region; determining whether a first display direction of the first image complies with a predetermined display direction or not; generating a collection adjusting instruction when the first display direction does not comply with the predetermined display direction; adjusting the image collecting components corresponding to the first region according to the collection adjusting instruction to obtain a fourth image, wherein a second display direction of the fourth image complies with the predetermined display direction; and providing the first image or the fourth image that complies with the predetermined display direction to a first application to which the first window corresponds.

Similarly, for example, the above electronic apparatus shown in FIGS. 19 and 20 may be further applied to the electronic apparatus shown in FIG. 4.

Herein, preferably, the electronic apparatus according to a preferable embodiment of the present invention comprises: an array of image display components configured to display a first window; a region position obtaining unit configured to obtain the position of a first region in the first window; an array of image collecting components set in correspondence with the array of image display components along a direction perpendicular to the screen of the electronic apparatus; and a collection control unit configured to turn on the image collecting components corresponding to the first region in the first window in the array of image collecting components according to the position of the first region, wherein the number of the image collecting components corresponding to the first region is less than or equal to the number of the image collecting components in the array of image collecting components; the array of image collecting components is configured to obtain a first image by the image collecting components corresponding to the first region. In addition, the electronic apparatus further comprises: a processing unit, configured to determine whether a first display direction of the first image complies with a predetermined display direction or not, and generate a collection adjusting instruction when the first display direction does not comply with the predetermined display direction; a collection adjusting unit configured to adjust the image collecting components corresponding to the first region according to the collection adjusting instruction to obtain a fourth image, wherein a second display direction of the fourth image complies with the predetermined display direction, and the processing unit includes an image providing module configured to provide the first image or the fourth image that complies with the predetermined display direction to a first application to which the first window corresponds.

In this way, via the solutions provided by the preferable embodiment of the present invention, there is no need to turn on all the components in the array of image collecting components when turning on the apparatus, instead, only the corresponding image collecting components in the array of image collecting components are to be turned on according to the window being viewed by the user, meanwhile the image collecting unit can be adjusted by determining whether the direction of the image collected by it complies with a predetermined display direction or not, so as to provide the image having a display direction that complies with the predetermined display direction to the corresponding application, thereby reducing the power consumed by the array of image collecting components and effectively decreasing the transmitted data amount while maintaining the image resolution. And, the user does not need to adjust his/her own position to cater to the collecting direction of the image collecting unit.

Those of ordinary skill in the art can realize that, units and algorithm steps of the respective examples described in combination with the embodiments disclosed in this specification can be achieved by electronic hardware, computer software or the combination thereof. And, the software modules may be placed in any form of computer storage mediums. In order to clarify the interchangeability of the software and the hardware, constitutions and steps of the respective examples have been described generally according to the functions in the above illustration. It depends on the particular application and design constraints of the technical solutions whether these functions will be performed by hardware or software manner. As for each specific application, those of skill in the art can achieve the described functions using different methods, but such implementation should not be considered to go beyond the scope of the present invention.

Those of skill in the art should understand that various modifications, combinations, partial combinations and replacements may be made to the present invention depending on the design requirements and other factors, so long as they are within the scope of the appended claims and their equivalents.

What is claimed is:

1. A control method applied to an electronic apparatus, wherein the electronic apparatus comprises: an array of image display components and an array of image collecting components set in correspondence with each other along a direction perpendicular to the screen of the electronic apparatus, the method comprising:

displaying a first window by the array of image display components;

obtaining the position of a first region in the first window;

turning on the image collecting components corresponding to the first region in the first window in the array of image collecting components according to the position of the first region, wherein the number of the image collecting components corresponding to the first region is less than or equal to the number of the image collecting components in the array of image collecting components; and obtaining a first image by the image collecting components corresponding to the first region; and displaying a second window by the array of image display components, while displaying the first window;

obtaining the position of a third region in the second window;

turning on the image collecting components corresponding to the third region in the second window in the array of image collecting components according to the position of the third region, while the image collecting components corresponding to the first region in the first window in the array of image collecting components according to the position of the first region are turned on, wherein the number of the image collecting components corresponding to the third region is less than or equal to the number of the image collecting components in the array of image collecting components;

obtaining a second image by the image collecting components corresponding to the third region; and providing the first image to a first application to which the first window corresponds, and meanwhile providing the second image to a second application to which the second window corresponds according to the correspondence between the image collecting components and the windows.

2. The method according to claim 1, further comprising:

moving the first window according to a first window move instruction;

obtaining the position of the first region in the moved first window in real time; and turning on the image collecting components corresponding to the first region in the moved first window in the array of image collecting components according to the position of the first region in the moved first window.

3. The method according to claim 2, before the step of moving the first window according to a first window move instruction, further comprising:

recognizing a collected object in the first image;

determining the position of the collected object in the first image; and generating the first window move instruction when the position of the collected object in the first image exceeds a predetermined range.

4. The method according to claim 1, further comprising:

determining a free region that displays no window in the array of image collecting components; and turning off the image collecting components corresponding to the free region in the array of image collecting components.

5. The method according to claim 1, further comprising:

obtaining the position of a second region in the first window;

turning on the image collecting components corresponding to the second region in the first window in the array of image collecting components according to the position of the second region, wherein the number of the image collecting components corresponding to the second region is less than or equal to the number of the image collecting components in the array of image collecting components;

obtaining the position of an operating body by the image collecting components corresponding to the second region;

providing the first image to a first application to which the first window corresponds; and providing the position of the operating body to the first application.

6. The method according to claim 1, further comprising:

moving the first window according to a first window move instruction;

obtaining the position of the first region in the moved first window in real time; and turning on the image collecting components corresponding to the first region in the moved first window in the array of image collecting components according to the position of the first region in the moved first window.

7. The method according to claim 6, further comprising:

merging the first window and the second window into a third window when a display region of the moved first window and a display region of the second window at least partially overlap;

obtaining the position of a fourth region in the third window;

turning on the image collecting components corresponding to the fourth region in the third window in the array of image collecting components according to the position of the fourth region, wherein the number of the image collecting components corresponding to the fourth region is less than or equal to the number of the image collecting components in the array of image collecting components;

obtaining a third image by the image collecting components corresponding to the fourth region; and providing the third image to the first application and the second application respectively.

8. The method according to claim 1, further comprising:

determining whether a first display direction of the first image complies with a predetermined display direction or not;

generating a collection adjusting instruction when the first display direction does not comply with the predetermined display direction;

adjusting the image collecting components corresponding to the first region according to the collection adjusting instruction to obtain a fourth image, wherein a second display direction of the fourth image complies with the predetermined display direction; and providing the first image or the fourth image that complies with the predetermined display direction to a first application to which the first window corresponds.

9. The method according to claim 8, wherein the predetermined display direction is a display direction of the first window, and the step of determining whether a first display direction of the first image complies with a predetermined display direction or not comprises:

receiving a window rotating operation; and determining whether the first display direction complies with a display direction of the rotated window or not according to the window rotating operation.

10. The method according to claim 8, wherein the step of determining whether a first display direction of the first image complies with a predetermined display direction or not comprises:

recognizing a collected object in the first image; and determining whether a first display direction of the collected object complies with the predetermined display direction or not.

11. The method according to claim 8, wherein the step of generating a collection adjusting instruction when the first display direction does not comply with the predetermined display direction comprises:

determining an interval angle between the first display direction and the predetermined display direction; and generating the collection adjusting instruction according to the interval direction.

12. The method according to claim 11, wherein the step of adjusting the image collecting components corresponding to the first region according to the collection adjusting instruction to obtain a fourth image comprises:

in response to the collection adjusting instruction, rotating the image collecting components corresponding to the first region according to the interval angle; and obtaining the fourth image by the rotated image collecting components corresponding to the first region.

13. The method according to claim 11, wherein the step of adjusting the image collecting components corresponding to the first region according to the collection adjusting instruction to obtain a fourth image comprises:

in response to the collection adjusting instruction, rotating the first image obtained by the image collecting components corresponding to the first region according to the interval angle, to obtain the fourth image.

14. An electronic apparatus, comprising:

an array of image display components configured to display a first window;

a region position obtaining unit configured to obtain the position of a first region in the first window;

an array of image collecting components set in correspondence with the array of image display components along a direction perpendicular to the screen of the electronic apparatus; and a collection control unit configured to turn on the image collecting components corresponding to the first region in the first window in the array of image collecting components according to the position of the first region, wherein the number of the image collecting components corresponding to the first region is less than or equal to the number of the image collecting components in the array of image collecting components, the array of image collecting components is configured to obtain a first image by the image collecting components corresponding to the first region, wherein the array of image display components is further configured to display a second window, while displaying the first window;

the region position obtaining unit is further configured to obtain the position of a third region in the second window;

the collection control unit is further configured to turn on the image collecting components corresponding to the third region in the second window in the array of image collecting components according to the position of the third region, while the image collecting components corresponding to the first region in the first window in the array of image collecting components according to the position of the first region are turned on, wherein the number of the image collecting components corresponding to the third region is less than or equal to the number of the image collecting components in the array of image collecting components;

the array of image collecting components is further configured to obtain a second image by the image collecting components corresponding to the third region;

the electronic apparatus further comprises:
a processing unit comprising an image providing module configured to provide the first image to a first application to which the first window corresponds and meanwhile provide the second image to a second application to which the second window corresponds according to the correspondence between the image collecting components and the windows.

15. The electronic apparatus according to claim 14, wherein the electronic apparatus further comprises:
a processing unit comprising a window move module configured to move the first window according to a first window move instruction;
the region position obtaining unit is further configured to obtain the position of the first region in the moved first window in real time;
the collection control unit is further configured to turn on the image collecting components corresponding to the first region in the moved first window in the array of image collecting components according to the position of the first region in the moved first window.

16. The electronic apparatus according to claim 15, wherein the processing unit further comprises:
an image recognizing module configured to recognize a collected object in the first image;
a determining module configured to determine the position of the collected object in the first image; and
an instruction generating module configured to generate the first window move instruction when the position of the collected object in the first image exceeds a predetermined range.

17. The electronic apparatus according to claim 14, further comprising:

a free region determining unit configured to determine a free region that displays no window in the array of image collecting components,
the collection control unit is further configured to turn off the image collecting components corresponding to the free region in the array of image collecting components.

18. The electronic apparatus according to claim 14, wherein
the region position obtaining unit is further configured to obtain the position of a second region in the first window;
the collection control unit is further configured to turn on the image collecting components corresponding to the second region in the first window in the array of image collecting components according to the position of the second region, wherein the number of the image collecting components corresponding to the second region is less than or equal to the number of the image collecting components in the array of image collecting components;
the array of image collecting components is further configured to obtain the position of an operating body by the image collecting components corresponding to the second region, and
the electronic apparatus further comprises:
a processing unit comprising:
an image providing module configured to provide the first image to a first application to which the first window corresponds; and
a position providing module configured to provide the position of the operating body to the first application.

19. The electronic apparatus according to claim 14, further comprising:
the processing unit further comprises a window move module configured to move the first window according to a first window move instruction;
the region position obtaining unit is further configured to obtain the position of the first region in the moved first window in real time;
the collection control unit is further configured to turn on the image collecting components corresponding to the first region in the moved first window in the array of image collecting components according to the position of the first region in the moved first window.

20. The electronic apparatus according to claim 19, wherein
the processing unit is further configured to merge the first window and the second window into a third window when a display region of the moved first window and a display region of the second window at least partially overlap;
the region position obtaining unit is further configured to obtain the position of a fourth region in the third window;
the collection control unit is further configured to turn on the image collecting components corresponding to the fourth region in the third window in the array of image collecting components according to the position of the fourth region, wherein the number of the image collecting components corresponding to the fourth region is less than or equal to the number of the image collecting components in the array of image collecting components;
the array of image collecting components is further configured to obtain a third image by the image collecting components corresponding to the fourth region; and the image providing module is further configured to provide the third image to the first application and the second application respectively.

21. The electronic apparatus according to claim 14, further comprising:
a processing unit configured to determine whether a first display direction of the first image complies with a predetermined display direction or not, and generate a collection adjusting instruction when the first display direction does not comply with the predetermined display direction;
a collection adjusting unit configured to adjust the image collecting components corresponding to the first region according to the collection adjusting instruction to obtain a fourth image, wherein a second display direction of the fourth image complies with the predetermined display direction,
the processing unit comprises an image providing module configured to provide the first image or the fourth image that complies with the predetermined display direction to a first application to which the first window corresponds.

22. The electronic apparatus according to claim 21, wherein
the predetermined display direction is a display direction of the first window, and
the electronic apparatus further comprises:
a receiving unit configured to receive a window rotating operation;
the processing unit determines whether the first display direction complies with a display direction of the rotated window or not according to the window rotating operation.

23. The electronic apparatus according to claim 21, wherein
the processing unit is also configured to recognize a collected object in the first image; and
the processing unit determines whether a first display direction of the collected object complies with the predetermined display direction or not.

24. The electronic apparatus according to claim 21, wherein
the processing unit is configured to determine an interval angle between the first display direction and the predetermined display direction, and generate the collection adjusting instruction according to the interval direction.

25. The electronic apparatus according to claim 24, wherein
the collection adjusting unit, in response to the collection adjusting instruction, rotates the image collecting components corresponding to the first region according to the interval angle; and
obtains the fourth image by the rotated image collecting components corresponding to the first region.

26. The electronic apparatus according to claim 24, wherein
the collection adjusting unit, in response to the collection adjusting instruction, rotates the first image obtained by the image collecting components corresponding to the first region according to the interval angle to obtain the fourth image.

* * * * *